US008812227B2

(12) United States Patent
Carlson et al.

(10) Patent No.: US 8,812,227 B2
(45) Date of Patent: Aug. 19, 2014

(54) COLLISION AVOIDANCE SYSTEM FOR RAIL LINE VEHICLES

(75) Inventors: Richard C. Carlson, Wauconda, IL (US); Kurt A. Gunther, Round Lake Heights, IL (US); Marc W. Cygnus, Mundelein, IL (US)

(73) Assignee: Metrom Rail, LLC, Lake Zurich, IL (US)

( * ) Notice: Subject to any disclaimer, the term of this patent is extended or adjusted under 35 U.S.C. 154(b) by 0 days.

(21) Appl. No.: 13/474,428

(22) Filed: May 17, 2012

(65) Prior Publication Data

US 2012/0296562 A1 Nov. 22, 2012

Related U.S. Application Data

(60) Provisional application No. 61/598,750, filed on Feb. 14, 2012, provisional application No. 61/627,697, filed on Oct. 17, 2011, provisional application No. 61/519,201, filed on May 19, 2011.

(51) Int. Cl.

| | |
|---|---|
| ***G05D 1/02*** | (2006.01) |
| ***G06F 17/10*** | (2006.01) |
| ***G06G 7/78*** | (2006.01) |
| ***B61L 23/06*** | (2006.01) |
| ***B61L 15/00*** | (2006.01) |
| ***G08G 1/16*** | (2006.01) |
| ***B61L 25/02*** | (2006.01) |
| ***B61L 23/34*** | (2006.01) |

(52) U.S. Cl.

CPC ............ *B61L 15/0027* (2013.01); *B61L 23/06* (2013.01); *B61L 2205/04* (2013.01); *G08G 1/166* (2013.01); *B61L 25/025* (2013.01); *G08G 1/161* (2013.01); *B61L 23/34* (2013.01)

USPC .......................................... 701/301; 701/300

(58) Field of Classification Search

USPC ............. 342/53, 115, 118, 125, 70; 340/905; 701/408, 301, 29.6, 34.3, 36, 19, 13, 701/23, 4, 117, 468, 409, 63, 28, 1, 116, 701/500, 2, 46

See application file for complete search history.

(56) References Cited

U.S. PATENT DOCUMENTS

| | | | | |
|---|---|---|---|---|
| 5,904,210 | A * | 5/1999 | Stump et al. | 175/45 |
| 6,295,019 | B1 * | 9/2001 | Richards et al. | 342/125 |
| 6,473,028 | B1 * | 10/2002 | Luc | 342/118 |
| 6,674,396 | B2 * | 1/2004 | Richards et al. | 342/125 |

(Continued)

OTHER PUBLICATIONS

Time Domain's Ultra Wideband, (UWB), Definition and Advantages, 320-0294A, Mar. 2011, pp. 1-14, Huntsville, Alabama.

(Continued)

*Primary Examiner* — Thomas Black
*Assistant Examiner* — Robert Payne
(74) *Attorney, Agent, or Firm* — McAndrews, Held & Malloy, Ltd.

(57) ABSTRACT

A collision avoidance system (CAS) is described that includes one or more sensor technologies, including, for example, an Ultra Wideband (UWB) sensing technology. The collision avoidance system is designed to reliably track the location and speed of vehicles and the distance between vehicles over a wide variety of track and terrain. The collision avoidance system may utilize information from a variety of sensor technologies to determine whether one or more vehicles violate speed and/or separation criteria, and may generate a warning.

28 Claims, 15 Drawing Sheets

(56) References Cited

U.S. PATENT DOCUMENTS

| | | | | |
|---|---|---|---|---|
| 6,917,284 | B2 | 7/2005 | Grisham et al. | |
| 6,922,166 | B2 * | 7/2005 | Richards et al. | 342/125 |
| 7,089,099 | B2 * | 8/2006 | Shostak et al. | 701/29.6 |
| 7,148,791 | B2 | 12/2006 | Grisham et al. | |
| 7,725,252 | B2 * | 5/2010 | Heddebaut et al. | 701/408 |
| 8,231,270 | B2 * | 7/2012 | Groeneweg et al. | 374/141 |
| 2003/0028323 | A1 * | 2/2003 | Zeitler et al. | 701/219 |
| 2006/0025897 | A1 | 2/2006 | Shostak | |
| 2008/0150786 | A1 * | 6/2008 | Breed | 342/53 |
| 2010/0207787 | A1 * | 8/2010 | Catten et al. | 340/905 |
| 2010/0225527 | A1 * | 9/2010 | Talty et al. | 342/145 |
| 2013/0279392 | A1 * | 10/2013 | Rubin et al. | 370/312 |
| 2013/0279393 | A1 * | 10/2013 | Rubin et al. | 370/312 |
| 2013/0279491 | A1 * | 10/2013 | Rubin et al. | 370/347 |

OTHER PUBLICATIONS

International Search Report and Written Opinion of the International Searching Authority, International Application No. PT/US12/38332, International Filing Date May 17, 2012, METROM RAIL, dated Jul. 13, 2012.

PCT Notification Concerning Transmittal of Copy of International Preliminary Report on Patentability in International applciation No. PCT/US2012/038332, dated Nov. 28, 2013. (7 pages).

* cited by examiner

COLLISION AVOIDANCE SYSTEM FOR RAIL LINE VEHICLES

CROSS-REFERENCE TO RELATED APPLICATIONS

This application claims priority from the following three U.S. Provisional Patent Applications: (1) No. 61/519,201 filed on May 19, 2011, (2) No. 61/627,697 filed on Oct. 17 2011, and (3) No. 61/598,750 filed on Feb. 14, 2012. The disclosures of these three applications are incorporated by reference herein in their entireties.

FIELD

Certain embodiments of the present disclosure relate to a collision avoidance system for use in the railroad industry. More particularly, certain embodiments of the present disclosure relate to one or more systems, methods, techniques and/or solutions that monitor the location of and separation distance between rail line vehicles, for example, railroad maintenance vehicles.

BACKGROUND

Railroad companies must perform maintenance on their tracks and other infrastructure associated with their rail lines. The railroad companies employ many different types of rail mounted vehicles to accomplish such maintenance, and these vehicles can range widely in their size, weight and shape because the vehicles perform a variety of tasks. These vehicles may be employed in one or more work gangs, each work gang including anywhere from four to forty vehicles. As such, many vehicles may be working in close proximity on a single track.

The speed at which the work gang is traveling, and each vehicle within the gang, can vary widely at any given time. For example, the work gang may be traveling to a work site, in which case the work gang, and each vehicle, is traveling at a higher rate of speed than when the vehicles are working at a worksite. When the vehicles are working at a work site, each vehicle is generally traveling at a lower rate of speed or not at all. Within a work gang, the speeds of the vehicles may vary depending on the task that each vehicle is performing.

Railroads have had several severe collisions and other accidents, some resulting in fatalities, when adequate spacing has not been maintained between rail mounted vehicles. Railroad companies now require that a specific spacing be maintained between vehicles when traveling to/from work sites and when working at a work site.

BRIEF SUMMARY

One or more systems, methods, techniques and/or solutions are provided for a collision avoidance system for use in the railroad industry that may monitor the location of and separation distance(s) between rail line vehicles, for example railroad maintenance vehicles, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Figure 1A:
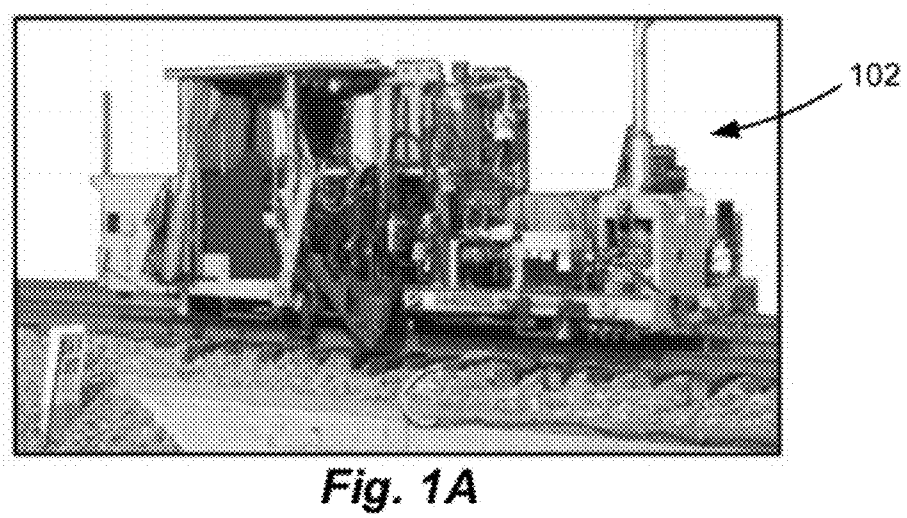
FIGS. 1A-1C depict illustrations of example rail line vehicles that may utilize a collision avoidance system, in accordance with one or more embodiments of the present disclosure.

Previous systems for preventing collisions of rail line vehicles have typically utilized a single sensor, for example a GPS or radar-based sensor, to monitor the approximate location of rail mounted vehicles. A shortcoming of single sensor systems, such as ones that depend on GPS sensors, is that the rail vehicles being monitored often enter into "blackout" areas (for example, around buildings, in the mountains, canyons, around sharp curves or in tunnels) where the single sensor may be unable to accurately determine the vehicle's location. For example, a GPS sensor may be unable to communicate with satellites when the vehicle is in a tunnel. Some previous systems attempted to solve this problem by performing a simple "dead reckoning" calculation, where the last known speed and direction of the vehicle are used to estimate the current position of the vehicle until the sensor signal is reestablished. This estimation calculation may not be precise enough to prevent collisions in work gangs because of the speed variation between vehicles. When the vehicles are traveling to a work site, the higher speeds introduce the risk of collision, and when the vehicles are working at a work site, the vehicle are frequently stopping and starting, and this variation in speed between vehicles renders the dead reckoning approach an unsuitable approximation.

A limitation of radar-based sensors in particular is that they may initiate numerous false positives (warning alarms that are not warranted). With the normal clutter of maintenance operations (people, equipment, trains on adjacent tracks, trackside structures, trestle sides, tunnel walls), radar-based sensors can become confused as to when vehicles are actually in danger of colliding. More specifically, radar-based sensors must deal with the following dilemma: the sensor must scan a wide enough field so that it can detect collision risks when vehicles are traveling on curves at higher speeds, yet as radar-based sensors scan wider fields, they become more susceptible to false detections, for example because the sensor also senses clutter. False detections can result in a dangerous work environment, especially if operators become immune to warnings.

The present disclosure describes a collision avoidance system (CAS) for rail line vehicles that may utilize a combination of sensor technologies, including an Ultra Wideband (UWB) sensing technology, to counter the limitations of previous systems, and to significantly reduce the potential for vehicle collisions and to enhance the safe operation of a variety of railway vehicles. The present technology is designed to reliably track the location and speed of railway vehicles, as well as the distance between vehicles over a wide variety of track and terrain conditions. The present technology may monitor the separation distance between rail line vehicles by utilizing sensors that are mounted on each vehicle in a group or work gang, where a work gang may comprising a plurality of railway vehicles, including railway maintenance equipment.

Figure 1B:
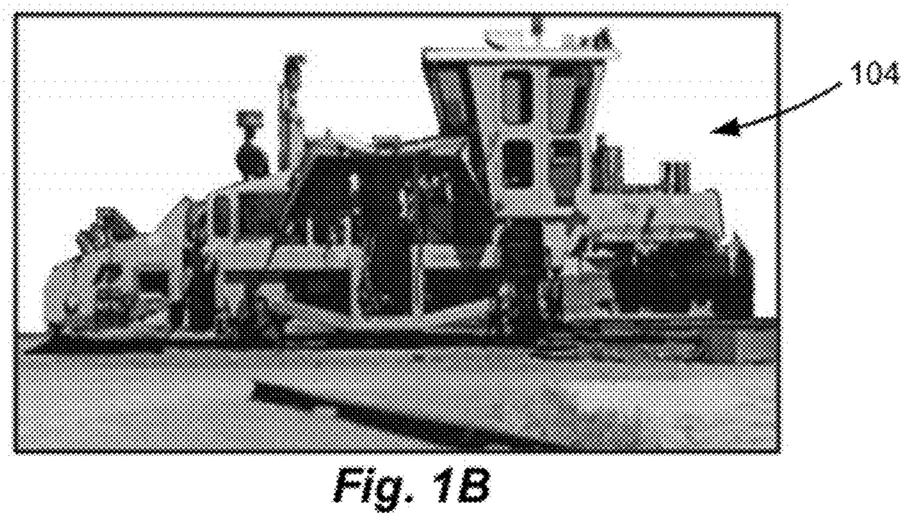
Figure 1C:
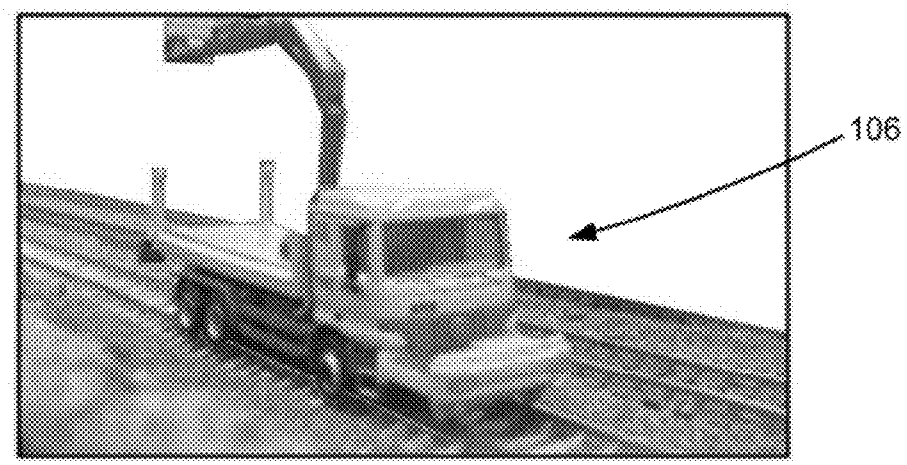
Figure 2:
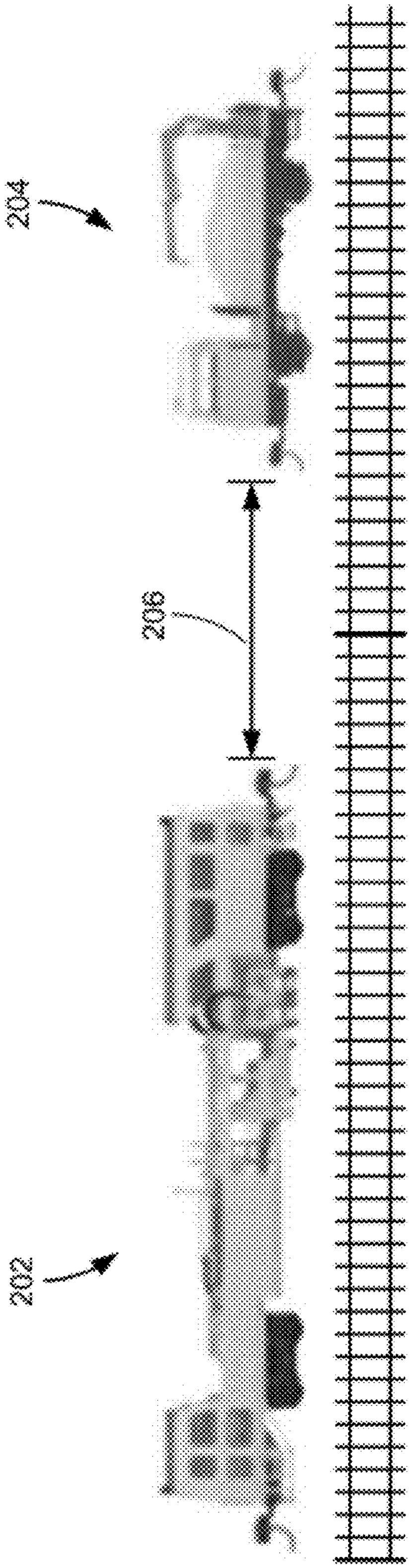
FIG. 2 depicts illustrations of example rail line vehicles that may utilize a collision avoidance system, in accordance with one or more embodiments of the present disclosure.

The CAS may perform the techniques and/or solutions described herein for a wide variety of railway vehicles, for example, railway maintenance equipment/vehicles, railcars, hyrail vehicles, train cars, train engines and other rail line vehicles. FIGS. 1A-1C depict illustrations of types of example rail line vehicles (vehicles 102, 104, 106) that may utilize a CAS or that a CAS as described herein may track. FIGS. 1A and 1B may depict example rail line maintenance vehicles and FIG. 1C may depict an example hyrail vehicle. FIG. 2 depicts illustrations of more example rail line vehicles (vehicles 202, 204) that may utilize a CAS or that a CAS system may track, and also shows an exemplary safe distance 206 between the two vehicles 202, 204. The CAS may track vehicles such as the ones depicted in FIGS. 1 and 2 (and others) over a wide range of terrain (e.g., mountains, canyons, hills, trees, tunnels, curves and trestles) and during a variety of weather conditions (e.g., rain, fog, snow, ice, bright sunlight).

The CAS may be designed to introduce redundancy into the system, for example in the form of multiple types of sensor technologies and/or multiple sensors of a particular type of technology. One benefit of utilizing redundant sensors may be that some sensors may function properly when other sensors are not functioning optimally or at all. Another benefit of utilizing redundant sensors is that different sensors may be adapted to sense objects and different distances and to different levels of accuracy. In some embodiments, a CAS may utilize a combination of distance sensors so that the CAS is adapted to detect vehicles that are either close or far away, and so that the CAS may detect vehicle separation to within a few inches if the vehicles are close.

Various embodiments of the present disclosure enable a rail line vehicle having a vehicle mounted module. The vehicle mounted module may comprise a transponder sensor module that includes an ultra wideband unit and a wireless communications antenna. The ultra wideband unit may be operable to detect a distance between the rail line vehicle and at least one other vehicle. The wireless communications antenna may be operable to send and receive data over the air. The vehicle mounted module may further comprise a control electronics module that includes a processor that is in communication with at least the ultra wideband unit. The vehicle mounted module may further comprise a user interface module including a user interface. The user interface may be operable to provide a vehicle operator with information and may be operable to accept input from the vehicle operator. The vehicle mounted module may be in communication with one or more central tracking units by way of the wireless communications antenna. The one or more central tracking units may be operable to track the location of the rail line vehicle and at least one other vehicle.

In some embodiments, the vehicle mounted module further comprises a central tracking unit module that is operable to track the location of at least one other vehicle. In some embodiments, the vehicle mounted module may be operable to utilize information generated by the global positioning system and the ultra wideband unit to determine whether one or more vehicle separation criteria are violated, and generate a warning if one or more vehicle separation criteria are violated. In some embodiments, the vehicle mounted modules comprises one or more additional transponder sensor modules. The vehicle mounted module may be operable to accept calibration information regarding the length of the rail line vehicle and the mounting locations of the transponder sensor module and the one or more additional transponder sensor modules.

In some embodiments, the transponder sensor module further includes a global positioning system. The global positioning system may be operable to receive information from one or more satellites and may be operable to determine the absolute position of the rail line vehicle. In some embodiments, the transponder sensor module further includes one or more of a laser device, a radar sensor and an infrared sensor. In some embodiments, the vehicle mounted modules may comprise an additional ultra wideband unit, wherein an offset exists between the ultra wideband unit and the additional ultra wideband unit once the two units are mounted on the rail line vehicle. In some embodiments, the ultra wideband unit is adapted to transmit and receive signals with varying center frequencies.

In some embodiments, the user interface module further includes a service interface that may be operable to allow the vehicle operator to configure, calibrate, service, maintain, diagnose, update and/or install information on vehicle mounted module. In some embodiments, the user interface is a touchscreen including a screen. The touchscreen may be operable to display one or more screens, menus, options and/or functions, and accept user input from the vehicle operator by allowing the vehicle operator to touch the screen of the touchscreen.

In some embodiments, the control electronics module further includes one or more interfaces that may be operable to communicate with ground speed detection modules. The ground speed detection modules may include one or more of a microwave radar, a laser device, an infrared sensor and an ultra wideband sensor. In some embodiments, the control electronics module further includes one or more inertial measurement units. In some embodiments, the control electronics module further includes an inertial measurement unit.

In some embodiments, the vehicle mounted module may be operable to utilize a progressive warning feature that generates a warning if one or more vehicle separation thresholds are violated. The rate, frequency, prominence and/or severity of the warning may increase as the violation of the vehicle separation threshold becomes more critical. The progressive warning feature may utilize an adaptive threshold feature that modifies the one or more vehicle separation thresholds based on the speed of the rail line vehicle and the speed of one or more nearby vehicles. In some embodiments, the vehicle mounted module may be operable to utilize a stopping distance calibration feature that measures a stopping distance. The stopping distance may indicate how quickly the rail line vehicle can stop under current conditions. The measured stopping distance may be used to modify one or more safe separation distance thresholds.

Various embodiments of the present disclosure enable a collision avoidance system for rail line vehicles that may comprise one or more vehicle mounted modules, each mounted on a vehicle. Each vehicle mounted module may comprise a transponder sensor module including an ultra wideband unit and a wireless communications antenna. The ultra wideband unit may be operable to detect a distance between the vehicle on which the vehicle mounted module is mounted and at least one other vehicle. The wireless communications antenna may be operable to send and receive data over the air. Each vehicle mounted module may comprise a control electronics module including a processor that is in communication with at least the ultra wideband unit. Each vehicle mounted module may comprise a user interface module including a user interface. The user interface may be operable to provide a vehicle operator with information and may be operable to accept input from the vehicle operator.

The collision avoidance system that may comprise a central tracking unit that is in communication with the one or more vehicle mounted modules. The central tracking unit may be operable to track the location of the one or more vehicle mounted modules. In some embodiments, the central tracking unit may be distributed among the one or more vehicle mounted modules, wherein each of the one or more vehicle mounted modules includes a central tracking unit component. Each central tracking unit component may be in communication with the vehicle's control electronics module. In some embodiments, the central tracking unit may be disposed in a discrete housing.

In some embodiments, the transponder sensor module further includes a global positioning system. The global positioning system may be operable to receive information from one or more satellites and may be operable to determine the absolute position of the vehicle mounted module. Each vehicle mounted module may be operable to utilize information generated by the global positioning system, the ultra wideband unit and the central tracking unit to determine whether one or more vehicle separation criteria are violated, and generate a warning if one or more vehicle separation criteria are violated.

Figure 3:
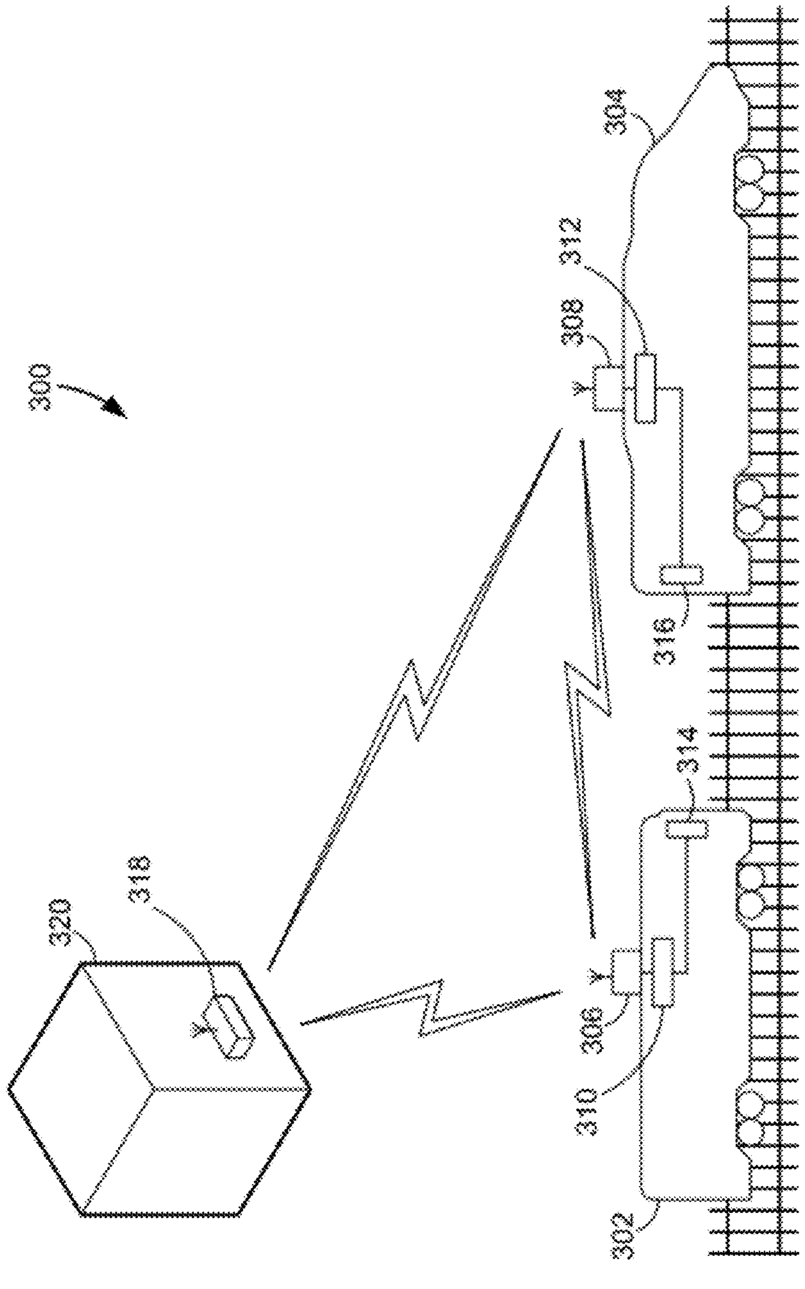
FIG. 3 depicts an illustration of an example collision avoidance system, in accordance with one or more embodiments of the present disclosure.

FIG. 3 depicts an illustration of an example collision avoidance system (CAS) 300 for rail line vehicles according to one or more embodiments of the present disclosure. For example purposes only, FIG. 3 depicts a work gang including only two vehicles 302, 304. In this embodiment, the CAS 300 includes four main types of components—transponder sensor modules (TSMs) (for example, TSMs 306, 308), control electronics modules (CEMs) (for example, CEMs 310, 312), user interface modules (UIMs) (for example, UIMs 314, 316) and a central tracking unit (CTU) (for example, CTU 318). Referring to a single vehicle (vehicle 302 for example), modules that are located in or on the vehicle (for example, TSM 306, CEM 310 and UIM 314) may collectively be referred to as the vehicle mounted module (VMM), even though the individual modules and related components may or may not be housed within a unitary package/enclosure.

In some embodiments, the VMM components may not be installed on vehicles at production. In these examples, the VMM components may be designed to allow retrofitting into existing railway vehicles without requiring heavily intrusive installation.

The CAS may include a central tracking unit (CTU), for example the CTU 318 of FIG. 3. The CTU may operate to centrally track all the vehicles in one or more work gangs. The CTU may adapt a tracking software and/or system to monitor individual vehicles. The CTU may include technology adapted to dynamically define which vehicles are in a work gang, and/or which vehicles the CTU should keep track of. The CTU may accept information from VMMs mounted inside vehicles in the work gang, information such as location, speed, separation distance and the like. The CTU may have the ability to analyze and/or store various types of data about vehicles in one or more work gangs. For example, the CTU may analyze absolute and relative positioning data and speed data from vehicles in the work gang. In some examples, the CTU may determine if a separation distance between two vehicles has been violated, indicating that an accident may be likely. Additionally, the CTU may track alarm status of the vehicles in a work gang so that the central tracking unit becomes aware when an accident may have occurred. In another example, the central tracking unit may track data regarding accidents.

In the embodiment depicted in FIG. 3, the CTU 318 may be located in a discrete housing 320 (also referred to as a module, unit, bungalow or the like). It should be understood that the technology and features of the CTU need not reside in such a discrete housing 320 and may be distributed amongst the vehicles in the work gang, for example with a CTU module/component in each VMM. In embodiments where the CTU is located in a housing 320 that is discrete from the vehicles, the VMM may include a TSM, CEM, and UIM. In embodiments where the CTU is distributed amongst the vehicles, the VMM may further include a CTU module/component.

Figure 4:
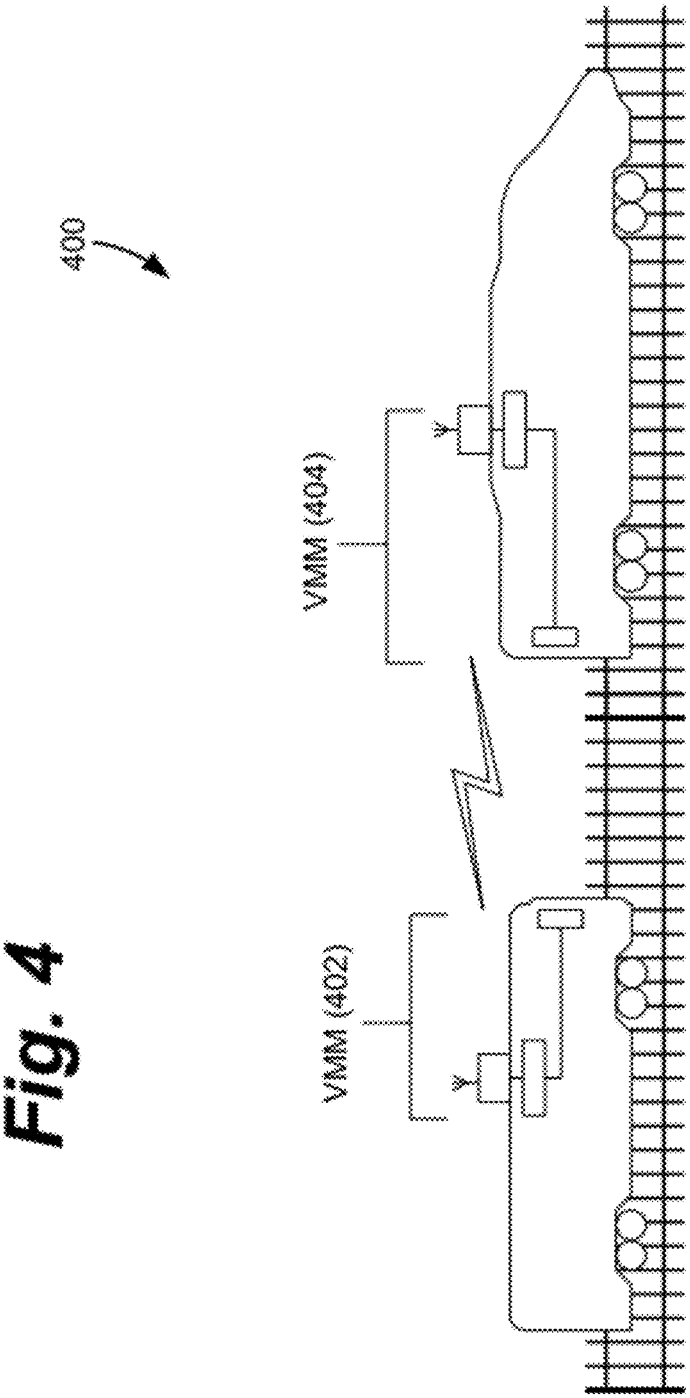
FIG. 4 depicts an illustration of an example collision avoidance system, in accordance with one or more embodiments of the present disclosure.

FIG. 4 depicts an illustration of an example collision avoidance system (CAS) 400 according to one or more embodiments of the present disclosure. In this embodiment, the system 400 does not include a discrete housing for the CTU technology. This embodiment still utilizes technology, functionality and features similar to those employed in a system (such as the CAS 300 of FIG. 3) with a CTU disposed in a discrete housing. In this embodiment, the functionality and intelligence of the CTU is dispersed and/or distributed among the VMMs (for example VMMs 402, 404) in the vehicles within a work gang. With this dispersed design (also referred to as "dispersed thinking"), each VMM includes its own CTU module/component that tracks the location of other vehicles in the work gang, like a CTU disposed in discrete housing would do. It should also be understood that although this embodiment describes a central tracking unit component, the central tracking unit circuitry and technology may be incorporated into other components/subcomponents of the VMM, such as the CEM.

Figure 5:
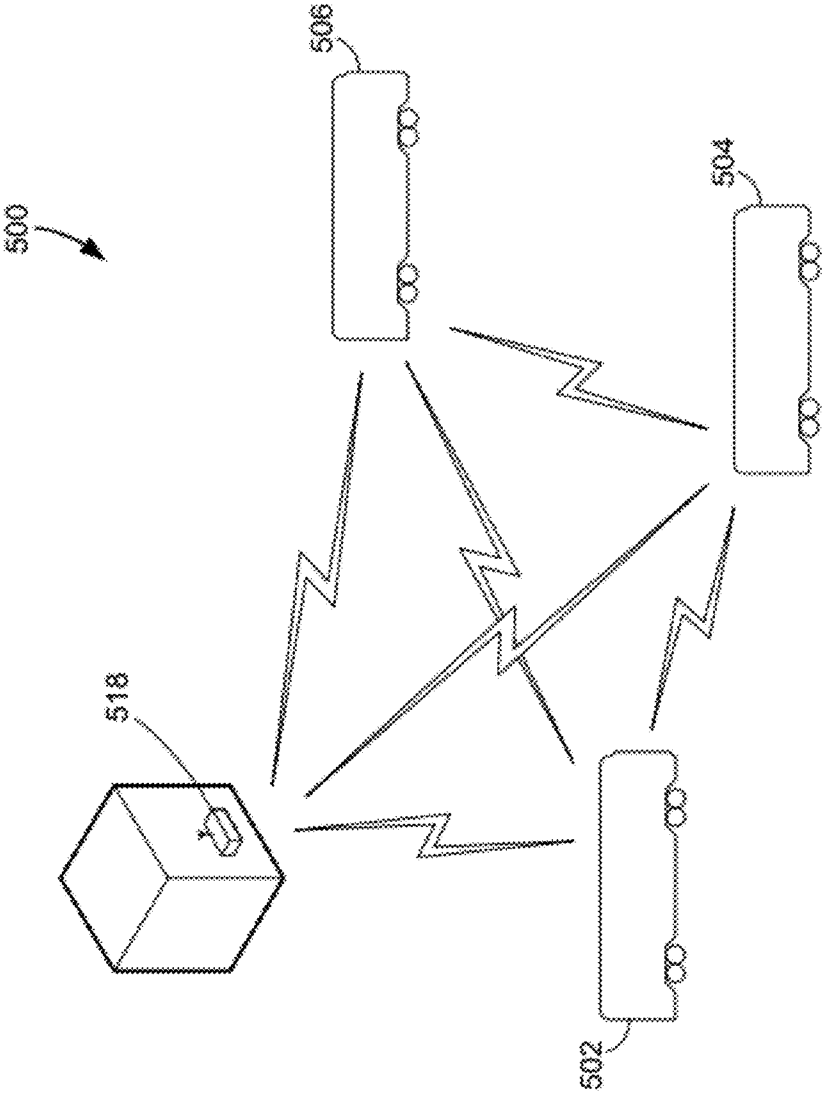
FIG. 5 depicts an illustration of an example collision avoidance system, in accordance with one or more embodiments of the present disclosure.

For example purposes, FIGS. 3 and 4 each show a work gang including only two vehicles, but it should be understood that work gangs may include more than two vehicles. FIG. 5 depicts an illustration of an example collision avoidance system (CAS) 500 with a work gang that includes more than two vehicles, according to one or more embodiments of the present disclosure. In this embodiment, each vehicle (for example, vehicles 502, 504, 506) in the work gang may be equipped with a VMM and each VMM may communicate with nearby VMMs (in nearby vehicles) as well as with a CTU 518 in a discrete housing, as can be seen in FIG. 5. In other embodiments of the present disclosure, each vehicle in a work gang is equipped with a VMM and each VMM communicates with nearby VMMs (in nearby vehicles) including a CTU module/component within each VMM (not depicted in FIG. 5). In these embodiments, there may be no CTU in a discrete housing such as the CTU 518 depicted in FIG. 5. FIG. 5 depicts a work gang with three vehicles, but it should be understood that a work gang may include more than three vehicles. As the size of the work gang becomes larger, the VMM mounted on each vehicle may communicate with more VMMs (in nearby vehicles), as well as with the CTU in a discrete housing (or a CTU module/component within the VMMS in each vehicle).

Figure 6:
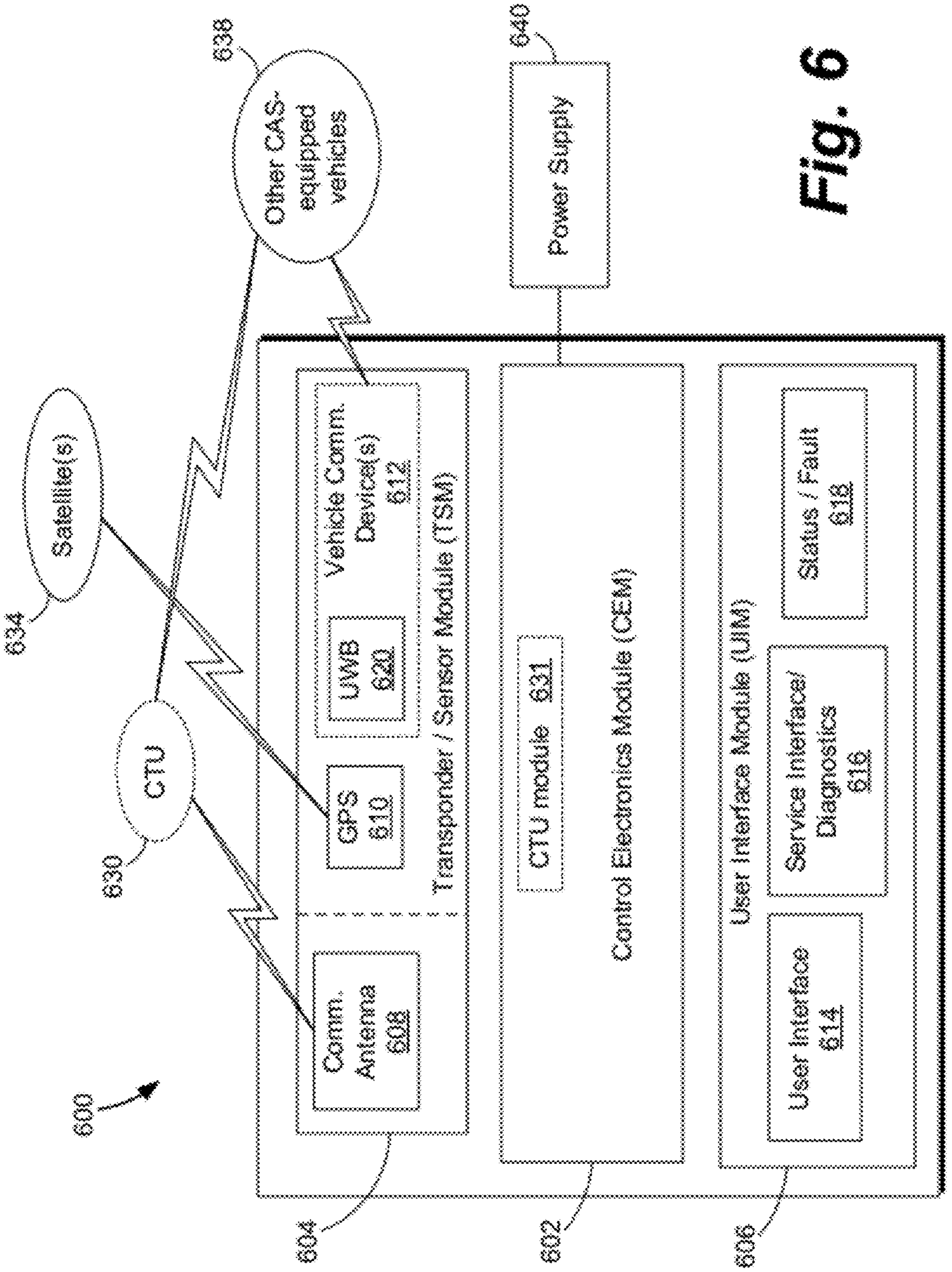
FIG. 6 depicts a block diagram of an example vehicle mounted module, in accordance with one or more embodiments of the present disclosure.

FIG. 6 depicts a block diagram of an example vehicle mounted module (VMM) 600, in accordance with one or more embodiments of the present disclosure. The VMM may include one or more control electronics modules (CEM) 602, one or more transponder sensor modules (TSM) 604, and one or more user interface modules (UIM) 606. The TSM 604 may further include a wireless communications antenna 608 (for example an RF antenna such as a 2.4 GHz radio antenna) that is operable to send and receive data over the air, for example to/from remote systems. The TSM 604 may further include a GPS unit 610 one or more vehicle communication devices 612. The UIM 606 may further include a user interface 614, a service interface 616 (optionally including diagnostics components/interfaces) and status/fault indicators 618. Additionally, the VMM 600 may receive power from a power supply 640 that may provide power to one or more vehicle mounted module components, for example components disposed within the CEM 602.

Wireless communications antenna 608 may be, for example, an RF antenna such as a 2.4 GHz radio antenna. As depicted in FIG. 6, a VMM 600 may communicate with a CTU 630 (for example a CTU located in a discrete housing or a number of CTU modules located in other VMMs) through a wireless communications antenna 608. The wireless communications antenna 608 may be housed in the TSM, or it may be housed separately and perhaps connected to CEM 602 independently. The circuitry for the radio associated with the wireless communications antenna 608 may be disposed in the TSM 604, or may be disposed in the CEM 602 and be connected to the wireless communications antenna 608 via a wired connection. The VMM 600 may transmit a variety of information to the CTU 630, for example, absolute position data, relative position data and speed data of the vehicle. Such information may have been obtained by the VMM utilizing various components and/or sensors, for example, the GPS unit 610, the UWB unit 620, and/or other sensors. The VMM 600 may transmit other information to the CTU 630, for example, status/fault and/or diagnostic information regarding the health of the VMM and its components. The VMM 600 may gather data from one or more satellites 634 utilizing a GPS unit 610, for example to acquire absolute positioning information. The VMM 600 may communicate with other CAS/VMM-equipped vehicles through one or more vehicle communication devices 612 and/or through a wireless communications antenna 608. In some embodiments, the vehicle communications devices 612 may include one or more separate wireless communications antennas (and perhaps associated radios) from antenna 608.

Referring to FIG. 6, in some embodiments, a CAS may not include a discrete CTU such as the one shown in FIG. 6 at CTU 630. In these embodiments, the VMM may include a CTU module/component 631 that tracks the location of (and provides location information to) other vehicles in the work gang by communicating with other CAS/VMM-equipped vehicles directly. The CTU module/component 631 may operate like (and include similar technology to) a discrete CTU (such as CTU 630) would operate in other embodiments. The CTU module/component may include technology adapted to dynamically define which vehicles are in the work gang, and/or which vehicles the CTU module/component should keep track of. It should also be understood that although the foregoing describes a CTU module/component, the CTU circuitry and technology may be incorporated into other modules, components and subcomponents of the VMM, such as the CEM. In some embodiments, the CTU module/component may be a software feature that is executed by a processor in the CEM.

VMM subcomponents (for example, the components included within the TSM, CEM and UIM) may be packaged together within a single enclosure. For example, in some embodiments, the CEM and UIM (and optionally, the CTU module) may be combined/disposed in a single package. One benefit of a single package may be that it simplifies the installation process. In alternate embodiments, or one or more VMM components and/or subcomponents may be packaged separately from the other components/subcomponents. The various components and/or subcomponents may be located separately, optionally within separate enclosures, and each separate component may be connected to a main VMM enclosure and/or to other VMM enclosures via wires or a short range wireless link. For example, wireless communications antenna 608 and/or one or more vehicle communication devices 612 may be mounted separately (optionally, in one or more enclosures) on the upper extremity of the vehicle, for example to reduce signal interference and to allow for proper antenna placement (see FIG. 8). Likewise, the user interface 614 may be located in the crew area or the passenger cab. The number of physical packages/enclosures included in each VMM and the mounting location of each package/enclosure may depend on the type (height, length, etc.) of vehicle the VMM is mounted on, or may depend on the configuration of the VMM. In one example, all of the components of the vehicle mounted module are housed within a single weatherproof enclosure. In another example, the wireless communications antenna (for example, wireless communications antenna 608) (or the entire wireless communications radio including the antenna) may be installed at a distance from other VMM enclosures/components to avoid interference between the wireless communications antenna and other components of the VMM, for example the UWB sensor.

Figure 7:
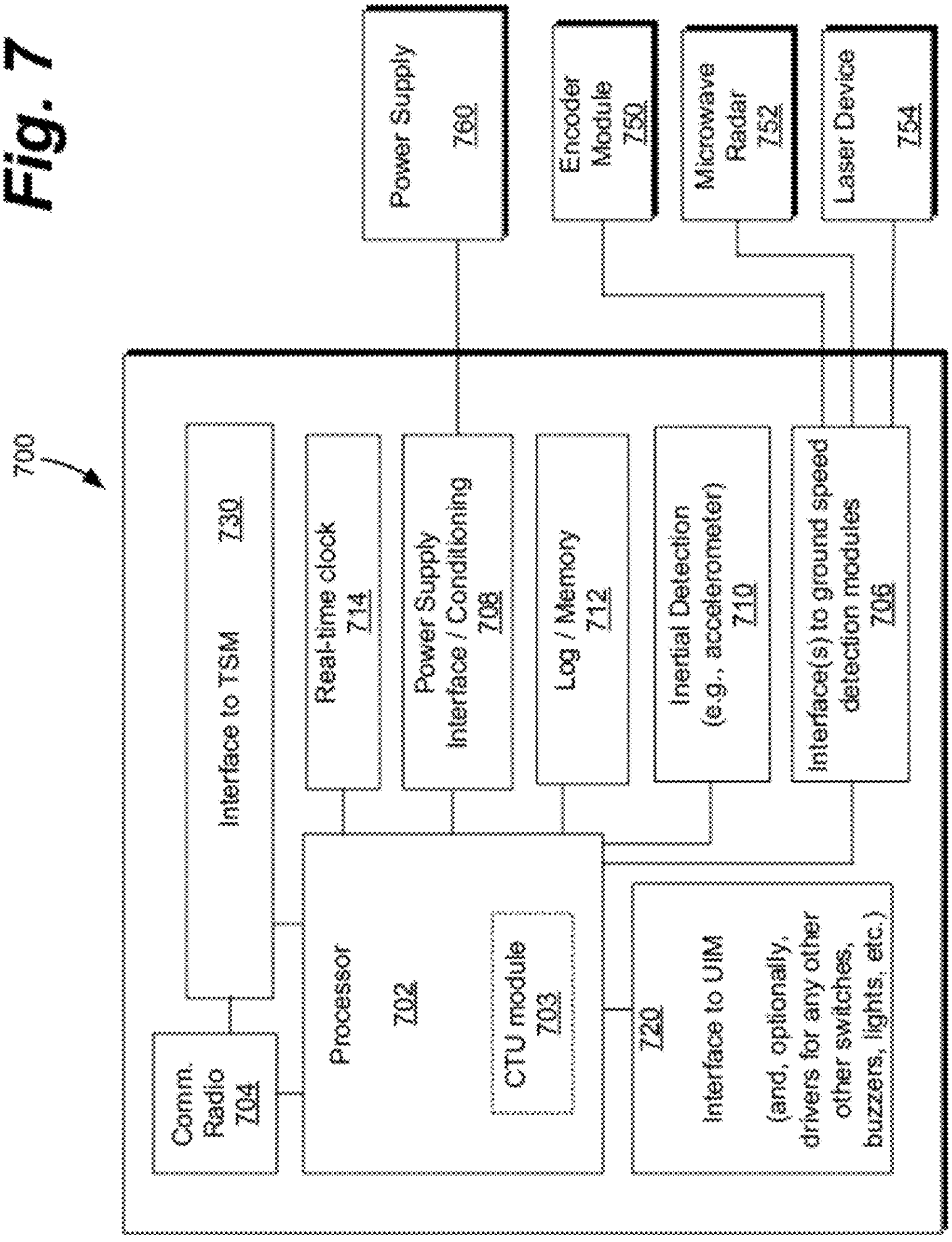
FIG. 7 depicts a block diagram of an example control electronics module, in accordance with one or more embodiments of the present disclosure.

FIG. 7 depicts an illustration of a block diagram of an example control electronics module (CEM) 700, in accordance with one or more embodiments of the present disclosure. The CEM 700 may include a processor 702, a wireless communications radio 704 (such as an RF radio), an interface to a TSM 730, an interface to a UIM 720, one or more interfaces 706 to ground speed detection modules, a power supply interface/power conditioning system 708, and a real-time clock 714. Examples of ground speed detection modules that may connect to interface 706 include an encoder module 750, a microwave radar 752 and/or a laser device 754. The interface to the UIM 720 may further include one or more drivers to power visual and/or audio indicators. In some embodiments, the CEM 700 may include one or more vehicular interfaces (interfaces to existing vehicle systems), for example a CAN interface, braking systems, speed indicators, equipment operating mode status indications and the like. The CEM 700 may include an inertial measurement unit 710 that includes one or more devices, for example, one or more accelerometers and/or gyroscopes. The CEM 700 may include a log/memory 712.

It should be understood that although FIG. 7 depicts some or all of the aforementioned subcomponents as being contained within the CEM 700, different configurations of the VMM are contemplated by this disclosure, including various combinations of VMM components/enclosures. Therefore, in some embodiments, the subcomponents depicted in FIG. 7 may be disposed outside of the CEM 700, for example in one or more other VMM enclosures. And in other embodiments, subcomponents other than those depicted in FIG. 7 may be disposed inside of the CEM 700, for example one or more subcomponents that may reside in other VMM enclosures in other embodiments. In some examples, some of the subcomponents depicted in FIG. 7 may reside in the UIM and/or the TSM and may connect to the CEM by way of wires or wireless connection(s).

Referring again to FIG. 7, CEM 700 may include a processor 702. The processor 702 may, among other operations, process information received from the vehicle communication devices, for example via the interface to the TSM 730. For example processor 702 may be in communication with and process information from a UWB unit via TSM interface 730. The processor 702 may also process information received from other modules, components and/or subcomponents of the VMM. The processor 702 may handle information and/or perform computations to, among other things, track other vehicles in a work gang and determine which vehicles present a potential hazard. It should be understood that the CTU may also process location and speed information from vehicles in a work gang and may also track vehicles in a work gang to determine when collisions may be imminent. The present disclosure contemplates various types of configurations whereby some or all of the tracking and processing components of the CAS may be located within the VMMs (for example, within a CTU module), within a CTU in a discrete housing, or a combination of both. In the example where a CTU module/component performs tracking of other vehicles, a CTU module 703 may be disposed within the CEM 700, perhaps implemented in processor 702. In some embodiments, the CTU module 703 may be a software feature that is executed by the CEM processor 702.

CEM 700 may include an inertial measurement unit 710 that includes one or more devices, for example, one or more accelerometers and/or gyroscopes. The inertial measurement unit 710 may be operable to, among other functions, detect changes in the speed of a traveling vehicle. Detecting changes in vehicle speed may be useful to aid in dead reckoning solutions instead of or in conjunction with short range distance measurement sensors. For example, if a vehicle travelled into a tunnel and the GPS unit could not establish a connection to satellites to provide positioning information, an inertial measurement unit may provide information regarding whether vehicles in a work gang have changed speeds while in the tunnel. An inertial measurement unit 710 may also be operable to detect sudden changes in speed, for example indicating that a vehicle was involved in a collision, or perhaps indicating some other event. The inertial measurement unit 710 (or some other VMM component) may then store/log data regarding the activities of the vehicle (and/or VMM components) surrounding the time of the event, similar to the way a flight recorder records events proximate to a plane crash. This recording component may collect information from the inertial measurement unit 710 and/or from other VMM components, for example from a UWB unit.

CEM 700 may include a real-time clock 714. The real-time clock 714 may provide accurate (optionally, synced) time readings, for example to facilitate development evaluation testing. The time and date of the real-time clock may be adjusted automatically, for example by receiving updates from a GPS unit via TSM interface 730. The time and date of the real-time clock may be adjusted by receiving change requests from the service interface or user interface via UIM interface 720. In one example, the real-time clock 714 may exhibit an accuracy of plus/minus 5 seconds per day at 25 degrees Celsius.

The CEM 700 may be mounted in or near the vehicle cab. For example, if the CEM 700 is packaged with a UIM, the CEM may be mounted in the cab near an operator. In other examples, the CEM may be mounted on an upper frame or part of the vehicle, for example within the vicinity of the TSM. For example, if the CEM is packaged with one or more components of the TSM, a higher mounting location may reduce interference for TSM modules, for example the GPS unit and/or UWB unit. The CEM may be packaged with the TSM in shorter vehicles for example. In some embodiments, it may be beneficial to package the CEM separately from the TSM. In one particular example, the CEM may be mounted directly below the TSM, were the TSM is disposed above or on the roof of the vehicle (see FIG. 8) and the CEM is disposed below the roof of the vehicle, for example fixed to the inner ceiling of the vehicle. In this example, the CEM may be sheltered from direct exposure to sunlight and the components of the TSM may experience minimal interference and a clear line of sight.

The CEM 700 may interface (for example via a power supply interface 708) with a power supply 760. The power supply interface 708 may include a power conditioning system. In one example, all power for the VMM components and subcomponents passes through the power supply interface/conditioning system 708 located in the CEM, and then power for the other VMM components is routed out from the CEM. In other examples, one or more VMM components may include their own power conditioning systems and may accept power from a power supply without receiving power that is channeled through the CEM. The power supply may be the same as the vehicle's power supply, for example a 12 VDC or 24 VDC power supply. Alternatively or in addition, the VMM may include an independent power supply such as a battery, solar panels, and the like.

Figure 8:
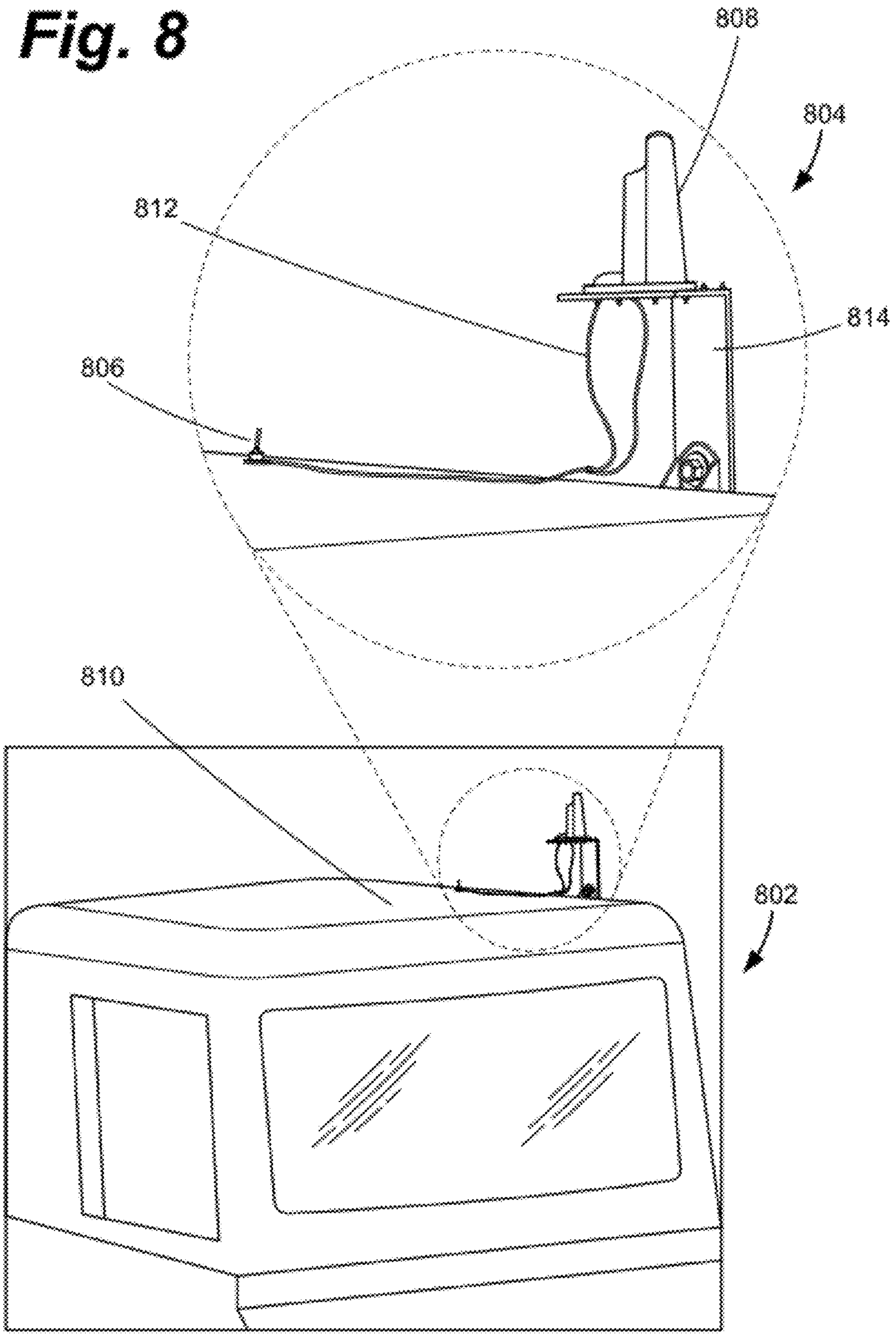
FIG. 8 depicts an illustration of side angled view of the upper portion of an example rail line vehicle and an example component mounting configuration, in accordance with one or more embodiments of the present disclosure.

Referring again to FIG. 6, VMM 600 may include a transponder sensor module (TSM) 604. In some implementations of the VMM, one or more components of the TSM 604 may be packaged with the CEM 602. In other implementations, it may be beneficial to package one or more TSM components separately from other VMM components, for example on an upper extremity of a vehicle. FIG. 8 depicts an illustration of side angled view of the upper portion 802 of an example rail line vehicle (for example a vehicle similar to the vehicle of FIG. 1C) and a mounting configuration 804 for one or more components of a TSM, in accordance with one or more embodiments of the present disclosure. One or more TSM components may be mounted at a high point (for example, the highest point) on the vehicle, where a clear line of sight may be established between the TSM components and an area to the front and rear of the vehicle.

In the example shown in FIG. 8, the wireless communications antenna 806 (for example, similar to the wireless communications antenna 608 of FIG. 6) and a UWB unit 808 (for example, similar to the UWB unit 620 included in the one or more vehicle communication devices 612 of FIG. 6) may be mounted separately from other VMM enclosures. In this example, the wireless communications antenna 806 and UWB unit 808 may be mounted on the upper extremity 810 of the vehicle to reduce signal interference and to allow for proper antenna placement. It should be understood that FIG. 8 depicts only one example of TSM components that may be mounted on the upper extremity of a vehicle. More or less TSM components (or other VMM components) than are shown in FIG. 8 may be mounted on the upper extremity of a vehicle. For example, components that may be mounted on the upper extremity of a vehicle may include the UWB unit, wireless/RF antennas and/or radios, GPS units, infrared sensors and the like.

TSM components (and/or other VMM components) may be installed on the upper extremity of a vehicle by a variety of means. Referring to FIG. 8, for example, a hole may be drilled through the side of an upper portion 802 of a vehicle or through the roof 810 to allow hardware to thread through the vehicle's upper portion 802 and also through VMM components to fix the components to the upper portion. Additionally, brackets, flanges, sockets or other hardware may be used to fix components to the upper portion 802. For example, FIG. 8 shows a bracket 814 that may be used to fix a UWB unit to the upper portion 802. The bracket 814 may be fixed to the upper portion 802 of a vehicle and the UWB unit may be fixed to the bracket. Brackets may aid in attaching components to the upper portion 802, and/or they may elevate components so that the components experience increased line of sight and decreased interference. One or more holes may be drilled through the roof 810 or a side wall of upper portion 802 to allow the passage of interface cables (for example, cable(s) 812 of FIG. 8) into and/or out of the cab of a vehicle.

Figure 9:
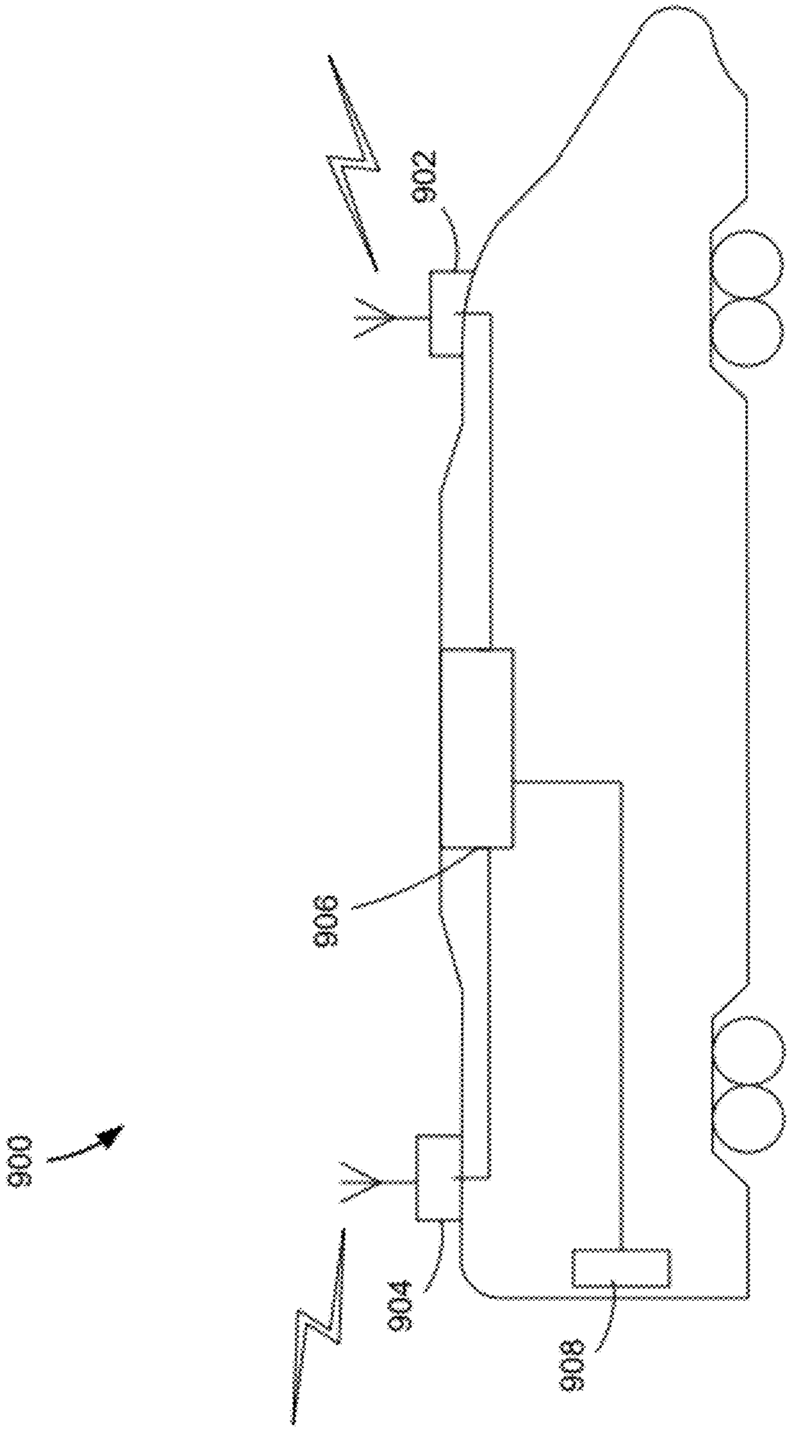
FIG. 9 depicts an illustration of an example rail line vehicle, including a vehicle mounted module, in accordance with one or more embodiments of the present disclosure.

FIG. 9 depicts an illustration of an example rail line vehicle 900, including a VMM that includes more than one TSM, in accordance with one or more embodiments of the present disclosure. In some embodiments of the disclosure, the VMM in a rail line vehicle may include more than one TSM, or may include more than one group of TSM components mounted on the upper extremity of a vehicle. With regard to the disclosure herein, when a description explains the configuration and/or benefits of multiple TSMs, it should be understood that the entire TSM may not be duplicated. Instead, one or more components of the TSM may be duplicated, while there may be a single instance of other components of the TSM. For example, the VMM may include duplicated vehicle communication devices, such as two or more UWB units. Additionally, while the disclosure herein may describe two TSMs, some embodiments may include VMMs with more than two TSMs.

Referring to FIG. 9, a VMM installed in a vehicle 900 may include two TSMs 902, 904 (or two groups of some TSM components), for example mounted at either end of the vehicle 900. As shown in the example of FIG. 9, the two TSMs 902, 904 may be mounted at the extreme (or near extreme) front and rear ends of the vehicle 900. Placing sensors, for example sensors included in TSMs 902, 904, at the extreme ends of a vehicle may improve the accuracy of some sensors, for example sensors that measure distance between vehicles (such as UWB sensors or infrared sensors). Especially if the vehicle 900 is long, a distance sensor (for example a sensor included in TSM 904) that is placed near the end of a vehicle may more accurately calibrate itself to determine the exact location of the end of the vehicle 900, and thus the sensor may be able to determine more accurately the distance between the end of the vehicle 900 and other vehicles. The two TSMs 902, 904 may be connected to a single CEM 906, which may be connected to a single UIM 908. In other embodiments, the VMM may include more than one CEM and/or more than one UIM.

When a VMM-equipped vehicle is initialized to operate with a CAS, the VMM components of the vehicle may be calibrated (also referred to as "commissioning" the vehicle) to the particular installation configuration for that vehicle. Calibration may include an operator specifying the vehicle length in each direction from the one or more mounted TSMs. Rail line vehicles (for example, maintenance vehicles) can range in length (see FIG. 1), for example from 12 feet to 80 feet, and the vehicles can have a variety of cab locations and configurations. Given the different lengths and configurations of vehicles, it may be necessary to program information into various components of the VMM, including the TSM and/or the CEM, such that the components are aware of (and/or can compute) the distance between the component's mounting location and the ends of the vehicle.

In some embodiments of the disclosure, circuitry within the VMM (for example in the CEM) may automatically compensate (calibrate) for the length of the vehicle and the mounting location. In one example, the VMM may include a single TSM, and the TSM may be mounted on the vehicle (for example, at the front or center of the vehicle), and circuitry within the VMM (for example in the CEM) may automatically compensating for the length of the vehicle and the mounting location. In another example, the VMM may include multiple TSMs, and the TSMs may be mounted on the vehicle (for example, near the front and rear of the vehicle), and circuitry within the VMM (for example in the CEM) may automatically compensating for the length of the vehicle and the mounting location of the multiple VMMs. The sensors may be designed to adjust for the size of the equipment and specific location of the components. The present disclosure contemplates various methods and solutions to adjust settings of VMM's components at initial installation to aid in component awareness. Components may contain smart technology that aids in the component's calibration. The VMM components may also be operable to account for a length of a vehicle that may change on the fly. For example, some vehicles change length when retractable sections are extended. The VMM components may be designed to accommodate this change in length, either by manual user input or automatic detection of the vehicle configuration.

Referring again to FIG. 6, the TSM 604 may include one or more vehicle communication devices 612. It should be understood that throughout this disclosure, when reference is made to vehicle communication devices, there may only exist a single vehicle communication device, for example just a UWB unit. In other examples, there may be more than one vehicle communication device. Vehicle communication devices 612 may be packaged together, or they may be packaged independently, or they may be packaged with other TSM components. The vehicle communication devices 612 may be in close communication with the CEM 602 via either a wired connection or a short range wireless connection. One benefit of a wired connection is that the CEM, which may contain a power conditioner unit and an interface to a power supply, can provide power to the vehicle communication devices, along with communication functions.

The vehicle communication devices 612 may communicate wirelessly with other CAS/VMM-vehicles 638 in the work gang. The vehicle communication devices 612 may be operable to, among other functions, determine the relative location of other CAS/VMM-equipped vehicles in relation to the present vehicle. The vehicle communication devices 612 may utilize one or more communication technologies and may include one or more integrated antennas for sending and receiving signals to and from other vehicles. In one example, each vehicle may have a unique identification code that was assigned when the VMM was installed in the vehicle, or before or after such installation.

In some embodiments of the present disclosure, the vehicle communication devices 612 may include an Ultra Wideband (UWB) unit 620 to communicate with other VMMs. In one specific example, the UWB unit 620 is the only vehicle communication device. The UWB unit may include a control board, a data interface and/or a UWB antenna. The UWB unit 620 is typically adapted for sending signals to and/or receiving signals from UWB units mounted on/inside other vehicles. The UWB unit 620 may be adapted to measure the relative separation distance between properly equipped vehicles without becoming confused by interference from nearby stationary or unrelated off-track equipment that might otherwise cause false alarms in radar-based collision avoidance systems.

Figure 10:
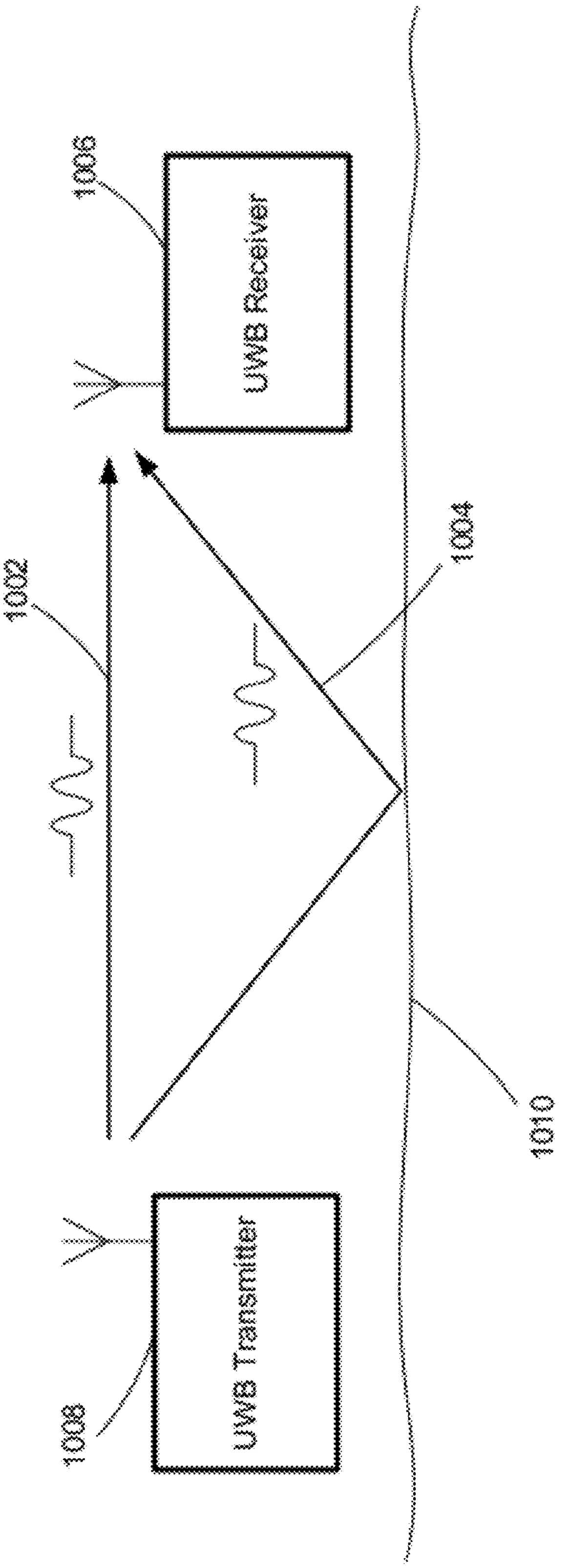
FIG. 10 depicts a block diagram illustrating example Ultra Wideband units, in accordance with one or more embodiments of the present disclosure.

FIG. 10 depicts a block diagram illustrating example UWB units, in accordance with one or more embodiments of the present disclosure. Pulses emitted from a UWB transmitter may spread in many directions. A UWB unit may transmit and receive pulses that are communicated directly 1002 between UWB units (for example between a UWB transmitter/transceiver 1008 and a UWB receiver/transceiver 1006), and/or the UWB unit may transmit and receive pulses that have been reflected 1004 (bounced) off of an object and/or surface, for example the ground. A UWB unit may be capable of resolving multipath reflections from a main signal by focusing on the first arriving pulse. Additionally, the UWB technology may take advantage of the fact that radio waves/pulses travel at a particular velocity. By measuring how long it takes a wave/pulse to travel (for example by reflecting/bouncing) between two transceivers, the distance between the UWB units can be accurately determined. This technique may be referred to as "Time of Flight" (TOF). In existing wireless radio technologies, TOF calculations have previously had limitations due to the reflection of radio waves from the wide range of objects in the vicinity. These reflections may result in the receipt of numerous conflicting signals of varying amplitudes, and in some instances one or more signals may cancel each other out, a phenomena referred to as "multi-path distortion". This may result in inaccurate distance determinations because a direct wave may have been cancelled out, and a reflected wave may travel a longer path and appear to be the first arriving pulse, resulting in a false (longer than actual) separation distance measurement.

A UWB unit may utilize a high bandwidth pulsed distance-measurement technology. A UWB transceiver may utilize a broad spectrum of frequencies simultaneously at a relatively low power levels. A UWB unit may be operable to periodically transmit short duration pulses, such as RF pulses. For example, a UWB unit may measure a distance of several hundred feet with a resolution of several inches. Precise range determination may be advantageous, for example when vehicle separations are small and/or when a potential GPS measurement error becomes significant. In one example, a GPS measurement error may be 10-15 feet. Additionally, each pulse transmitted by a UWB unit may be coded and the phase of the pulse may be modulated and the pulse repetition rate may be variable. Thus, a UWB unit may measure separation distances more accurately and be less susceptible to interference from geographic conditions and less susceptible to multi-path distortion than are other wireless technologies.

A UWB unit may transmit one or more signals that may be pseudo-randomly (and uniquely) encoded with low-amplitude RF energy spread over a 2 GHz bandwidth. The transmitted signal may be spread out over such a wide range of frequencies that the transmissions appear like normal background atmospheric noise. As a result, the signal is unlikely to cause interference with other communications systems. This encoding also means that information may be transmitted with the range finding signal, such that data communication may be accomplished while distance measurement is performed. In other words, the UWB unit may be adapted to transmit data to other UWB units in addition to detecting the distance to other UWB units. In effect, the two functions (data and distance) may be performed at the same time using the same wireless link because the UWB unit may transmit data, and then additionally, distance information may be computed by determine how long it took for the data to travel from one UWB unit to the other. It should be understood, however, that the two functions (data and distance) need not be performed at the same time.

The UWB unit may be adapted to send data as well as determine distance between vehicles. Because the UWB unit may be utilized to send data, some embodiments of the present disclosure, for example those where a central tracking component resides in the vehicle mounted module, may not need to use any other type of wireless or RF technology to communicate. This could reduce the technology components required in the system, reducing cost of the system. However, in other embodiments, a VMM may benefit by utilizing more than one data link (wireless technology capable of transmitting data). For example, a wireless RF link may provide a greater distance/range for sending data than a UWB unit, and because of this benefit and potentially other benefits of various types of data links/wireless technologies, a VMM may benefit by utilizing more than one type of data link. Additionally, a collision avoidance system may have multiple data links in order to introduce redundancy into the system. For example, the UWB unit may be capable of sending data if the RF link is not functioning properly, and vice versa.

One example of a UWB technology that the CAS may utilize is the technology described in the White Paper published by Time Domain entitled "Time Domain's Ultra Wideband (UWB): Definition and Advantages," which is incorporated by reference in its entirety herein. However, it should be understood that the collision avoidance system may utilize other designs and types of UWB technologies besides just the one described in the White Paper.

The UWB unit may be operable to measuring the vehicle separation independently. Thus, in various embodiments of the CAS, the UWB unit may replace the GPS unit, or the UWB unit may work in conjunction with the GPS unit. As explained above, the CAS may be designed to include redundancy in the system, for example in the form of multiple types of sensor technologies and/or multiple sensors of a particular type of technology. One benefit of utilizing redundant sensors may be that some sensors may function properly when other sensors are not functioning optimally or at all. For example, a GPS sensor may not communicate well with satellites when a vehicle is in a tunnel, and thus the GPS unit may not provide adequate information to the CAS in this situation. However, in this situation, the UWB unit (or other sensors/technologies) may be fully functional. For example, tests have been performed in tunnels that stretch up to 1 mile in length (or longer), and the tests have shown that a properly configured UWB unit may accurately measure distance and relative speed of vehicles in such a tunnel. UWB sensors (and/or other non-GPS type sensors) may also work in conjunction with a GPS sensor. For example, a UWB sensor may provide better resolution (i.e., can measure separation distance at finer increments, more accurately) and the GPS sensor may provide a location/separation information over a greater area.

Referring again to FIG. 6, once a UWB unit determines distance information, it may communicate this data to a CTU 630, for example via wireless communications antenna 608. Wireless communications antenna 608 may be an RF antenna, for example a 2.4 GHz radio antenna. In other embodiments, where there is no CTU in a discrete housing, UWB distance data (an optionally other data) may be communicated to CTU modules in other VMMs via wireless communications antenna 608 and/or a separate wireless communications antenna located in the TSM 604. In embodiments where the UWB unit is adapted to operate in conjunction with a GPS unit, combined GPS and UWB distance data may be communicated between a vehicle and the CTU 630 and/or between vehicles in the work group via similar wireless communications antennas/technologies as described herein.

Figure 11:
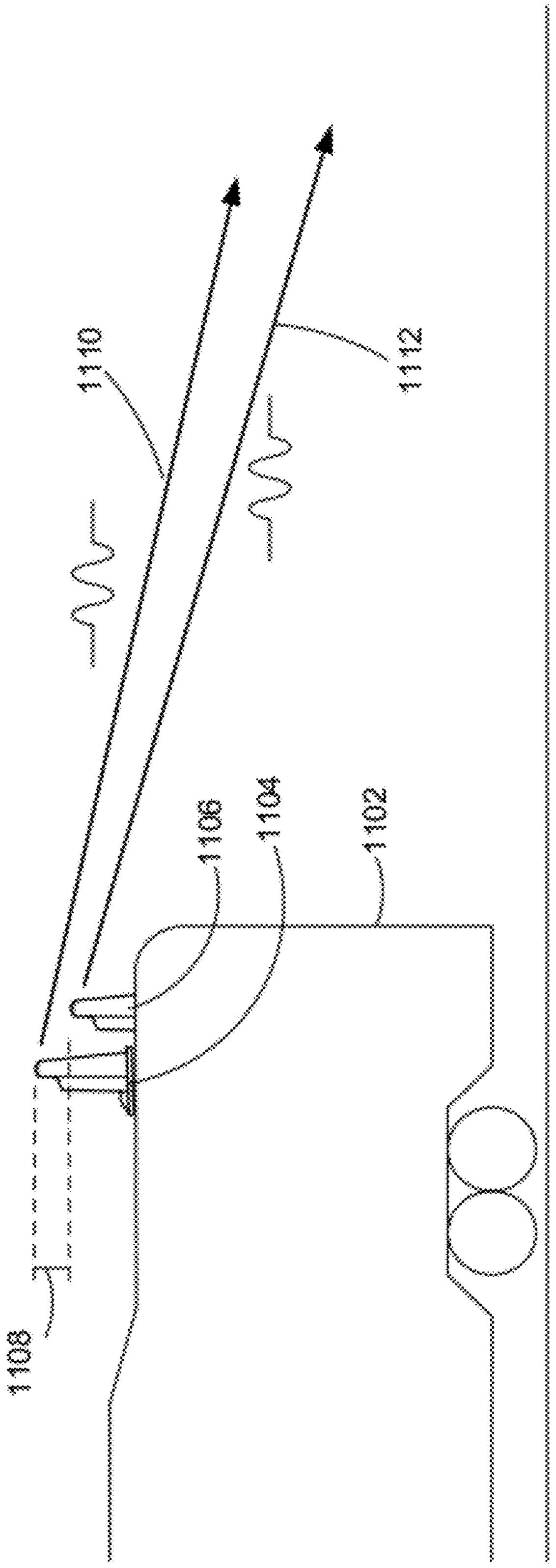
FIG. 11 depicts an illustration of a side view of an example rail line vehicle including multiple Ultra Wideband units, in accordance with one or more embodiments of the present disclosure.

FIG. 11 depicts and illustration of a side view of an example rail line vehicle including multiple UWB units (or multiple UWB components), in accordance with one or more embodiments of the present disclosure. In some embodiments, a VMM installed on a vehicle 1102 may include more than one UWB unit (for example, UWB units 1104, 1106), for example to introduce redundancy into the system. In some embodiments, a VMM installed on a vehicle 1102 may include more than one UWB antenna, and the multiple UWB antennas may share a common control board and/or data interface. When present disclosure describes multiple UWB units, it should be understood that the entire UWB unit may be duplicated or one or more components of the UWB unit may be duplicated, for example the UWB antenna. In some embodiments, multiple UWB units (or multiple UWB components) may be housed in a single enclosure. In other embodiments, multiple UWB units (or multiple UWB components) may be housed in separate enclosures, as depicted in FIG. 11.

In some situations, when a UWB pulse is reflected from an object or a surface (for example the ground), the UWB pulse may be destroyed (for example, by a reflected signal which is the same amplitude but 180 degrees out of phase) or altered before it gets to the UWB receiver, and/or other interference may cancel out a pulse. These situations where a UWB link might not transmit a pulse ideally may be referred to as "holes." In some embodiments, the VMMs may include more than one UWB unit (or UWB component), for example in case one UWB pulse is destroyed. In some examples, two UWB units (or two UWB antennas) may be mounted on a single vehicle with a small offset between the UWB antennas. For example, referring to FIG. 11, two UWB units (or two UWB antennas) 1104, 1106 may be mounted on a single vehicle 1102 with a small vertical distance 1108 between the UWB antennas. In this example, pulses 1110, 1112 from the two UWB units 1104, 1106 (respectively) may arrive at a UWB receiver of another vehicle after traveling slightly different distances (for example, because they reflected off the ground at different angles). Multiple/redundant UWB units may increase the probability that whatever surface and/or interference destroyed or altered one UWB pulse will not interfere with the second UWB pulse. In some examples, two UWB units (or two UWB antennas) may be mounted on a single vehicle with a small horizontal distance between the UWB antennas. The horizontal offset may provide information to the VMM to determine the orientation of nearby vehicles in relation to the immediate vehicle. For example, UWB unit information may show that a nearby/target vehicle that is in front of the immediate vehicle is closer to a front UWB antenna, and likewise for a rear vehicle/rear UWB antenna.

In some embodiments, one or more UWB units may be operable to transmit/receive signals with varying center frequencies. This multiple center frequency technique may work with a single UWB unit or it may work with multiple UWB units. In a single UWB unit example, the UWB controller may utilize adaptive output filters. The UWB unit may include a single UWB transceiver that is adapted to send multiple pulses/signals with different center frequencies at different times, for example alternating between modes (center frequencies). A corresponding UWB receiving unit may be synchronized with the UWB unit sending the signals, in that it may receive pulses/signals with different center frequencies at different times. In a multiple UWB unit example, one UWB unit may send signals at one center frequency and another UWB unit may send signals at a different center frequency. Variations in the center frequency of the UWB signals may result in a different phase delays of the signals, for example when reflected. If one signal has been significantly altered or destroyed by a reflection, another signal(s) (which utilizes a different center frequency) may be unaffected, or at least less affected, by the reflection. This may be because different frequency signal(s) over the same reflection path length may experience a different phase delay. This approach may improve the reliability of UWB communications under certain operating conditions.

Referring to FIG. 6, in some embodiments, the vehicle communication devices 612 may include other wireless communication devices/technologies (beyond or in replacement of a UWB unit) to communicate with other VMMs. In some embodiments, a VMM may utilize a wireless communications antenna/radio (for example, an RF antenna/radio) to communicate with other VMMs. In some embodiments, the same wireless communications antenna 608 that communicates with a CTU 630 may communicate with other VMMs. In some embodiments, the vehicle communication devices 612 may include an ultrasonic or short distance laser device. Some example ultrasonic or short distance laser devices can sense distances between zero and thirty feet. In yet other examples, the vehicle communication devices may utilize radar, infrared (IR), and/or optics technologies.

Referring again to FIG. 6, a TSM may include a Global Positioning System (GPS) unit 610. The GPS unit 610 may be incorporated to the TSM. In some embodiments, the GPS unit 610 may be packaged with one or more vehicle communication devices 612, or it may be packaged in the CEM. Alternatively, the GPS unit 610 may be housed separately or may be incorporated into other VMM components or subcomponents. The GPS unit may include either an integrated or separate antenna assembly.

The GPS unit 610 may be adapted to determine the absolute position and speed of a vehicle that is equipped with the GPS unit. Information/data generated by a GPS unit may allow real-time determination of vehicle velocity and location. This information/data may allow a GPS unit 610 to determine expected vehicle stopping distances and may enable logging of equipment location with respect to time and date. For example, absolute location information provided by a GPS unit 610 may be useful to track the work performed by a work gang. A GPS unit may also provide distance information regarding the distance between two GPS-equipped vehicles.

Some GPS-based systems may experience reduced accuracy at times or may lose all connection with satellites, for example, when a vehicle enters a deep valley or a tunnel. A GPS unit may provide distance information in conjunction with other technologies that provide distance information (for example, UWB, infrared) as a form of redundancy and/or to offer a variety of distance measurement ranges and precision. A GPS unit may be operable to determine vehicle position within a wider range, for example 10 to 15 feet. A GPS unit may allow for the determination of distances between vehicles that are too far apart for other types of distance detection technologies to function accurately. Then, other technologies, for example a UWB unit, may provide a more precise distance measurement, for example a distance within 6 inches. The accuracy of a GPS unit 610 may be enhanced by utilizing a WAAS (Wide Area Augmentation System), a system of ground reference stations across North America that provide GPS signal corrections. Corrections provided by a WAAS may improve the positioning capability of the GPS unit 610, for example by a factor of five, such that the location may be determined as accurately as within 2 to 3 feet.

Referring to FIG. 6, the VMM may include one or more user interface modules (UIM) 606. A UIM 606 may further include a user interface 614, a service interface 616 (optionally with diagnostic components/interfaces) and status/fault indicators 618. A UIM 606 may provide an operator with an interface by which the operator can engage with the technologies that are part of the VMM, and by which the operator may be alerted of events, for example if vehicle separation criteria are violated. A UIM may be located/mounted within convenient reach and view of the operator, and may be connected by an interface cable (or short range wireless connection) to other VMM modules, for example the CEM. For example, the UIM may be mounted in a vehicle cab in order to allow the operator to see and hear warning and alarm indications.

Status/fault indicators 618 may alert an operator that one or more VMM components and/or subcomponents are not operating in an optimal manner. In some embodiments of the present disclosure, the VMM components may be operable to "self-monitor," meaning they may be adapted to monitor their own operation and health. If a VMM detects degraded or non-optimal performance (for example regarding any of the sensors or other VMM components or subcomponents), the status/fault indicators 618 may alert an operator. In some embodiments, the VMM may communicate status/fault indication to the CTU (or CTU module(s), for example via a wireless communications antenna, for example wireless communications antenna 608.

Figure 12B:
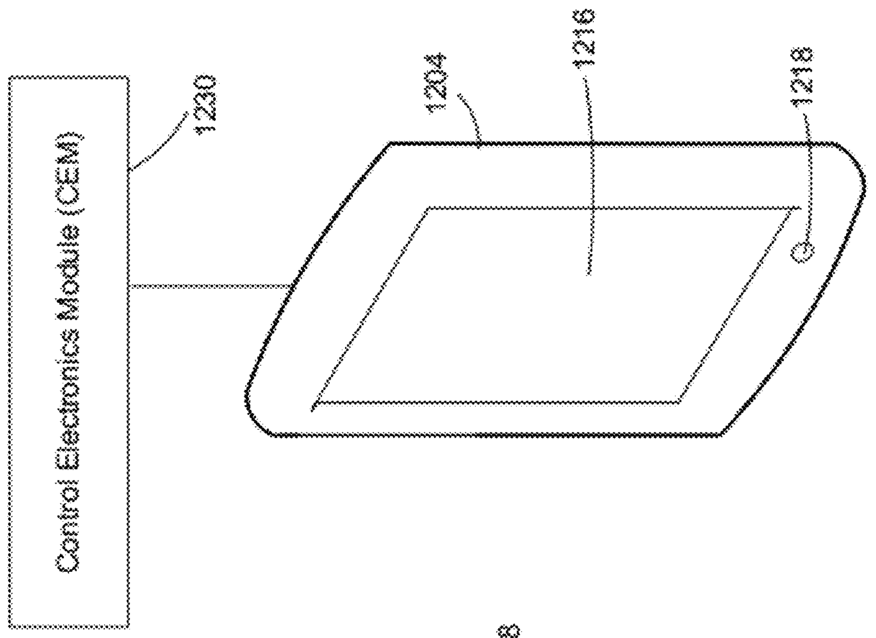
FIGS. 12A and 12B depict illustrations of example user interfaces, in accordance with one or more embodiments of the present disclosure.
Figure 12A:
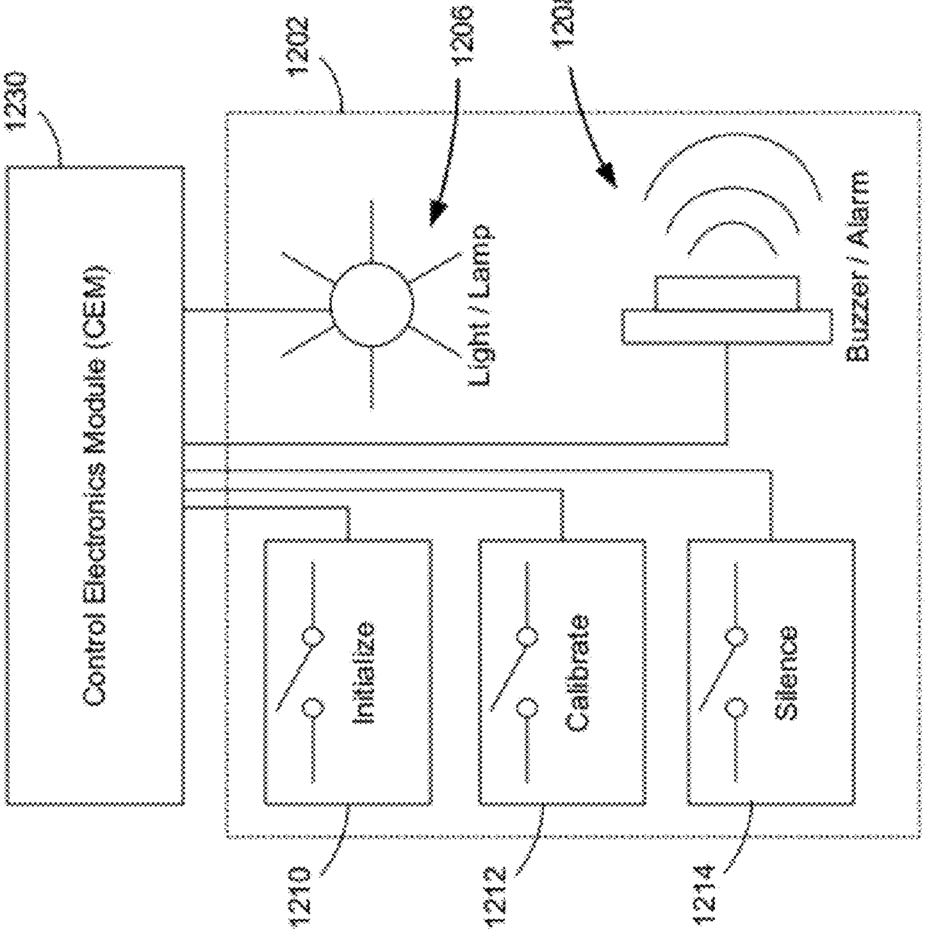

FIGS. 12A and 12B depict illustrations of example user interfaces, in accordance with one or more embodiments of the present disclosure. The UIM may include a user interface. Referring to FIGS. 12A and 12B, it can be seen that a user interface (for example user interfaces 1202, 1204) may include one or more means of alerting an operator of events, for example if vehicle separation criteria are violated. FIG. 12A shows one example of a user interface 1202. In this example, the user interface 1202 may include one or more visual indicators 1206, one or more audible indicators 1208, one or more switches/buttons 1210, 1212, 1214, and/or other input means or alerting means. Examples of visual indicators 1206 are lights, lamps, alpha-numeric character displays, LED's and the like. These indicators may provide an operator with information regarding the technologies included in the VMM, and certain indicators may alert the operator when an event occurs, for example when separation parameters (between vehicles for example) are exceeded. Examples of audible indicators 1208 are variable characteristic audible indicators, buzzers, alarms, sirens, horns and the like. The user interface 1202 may include one or more interface switches/buttons 1210, 1212, 1214 that may be adapted to allow an operator to configure and/or interact with components of the VMM. For example switches may be adapted to activate and deactivate component interfaces, for example component interfaces in the CEM. In one example, (and referring to FIG. 7), an operator may use a switch to deactivate the interface 706 to an encoder module. Examples of other input switches/buttons are buttons that acknowledge (temporary mute) a buzzer, alarm or a horn.

FIG. 12B shows another example of a user interface 1204. The user interface 1204 may be a touchscreen, tablet, PDA, monitor or other type of digital display/interface. Even though some descriptions of user interface 1204 may refer to it as a touchscreen, it should be understood that other alternatives mentioned and others may be contemplated. In some embodiments, a touchscreen may be implemented in conjunction with other types of user interfaces or user interface components, for example the components of user interface 1202. In some embodiments, a touchscreen may be adapted to serve as the only user interface component that interfaces with the operator. In some embodiments (and referring to FIG. 6), if a touchscreen is used to implement the user interface 614, other components of the UIM (for example the service interface 616 and/or the status/fault indicators 618) may be incorporated into the same touchscreen.

User interface/touchscreen 1204 may offer more flexibility and functionality than "hard" switches, lights, buzzers and the like. For example, a touchscreen may include on or more physical buttons (for example button 1218), but may also allow an operator to engage "soft"/temporary buttons on the screen 1216 of the touchscreen. In this respect, the touchscreen may offer similar functionality to hard switches/buttons. Additionally, a touchscreen may include one or more speakers and/or audio drivers, and thus the touchscreen may offer similar functionality to hard buzzers, alarms and the like. The screen 1216 of the touchscreen 1204 may also alert an operator to an event, offering similar functionally to hard lights, lamps and the like.

A touchscreen 1204 may be adapted (i.e., programmed, etc.) to display to an operator multiple sets of screens and/or menus, with multiple sets of options, functions and the like. Additionally, a touchscreen may be adapted to display complex (for example, graphical, textual, etc.) information to an operator. For example, a touchscreen may show the operator the speed of his vehicle, or may show operator his GPS coordinates. A touchscreen 1204 may be adapted (i.e., programmed, etc.) to offer additional functionality, for example allowing operators to send messages (for example text-based or html-based message) to nearby vehicles. In some embodiments, a touchscreen may provide a GPS-augmentation feature, for example, which may adapt the touchscreen to display the location of the vehicle relative to railroad mile markers.

It should be understood that the components and/or functionalities of user interfaces 1202 and 1204 may be incorporated into or implemented in one or more physical housings and/or devices. These components may be incorporated into discrete enclosure(s) (for example mounted near an operator/cab) and/or they may be incorporated into VMM components. In some embodiments, the user interface (for example, interfaces 1202 and/or 1204) may be mounted alongside or in the same enclosure as the CEM 1230 or it may be mounted in a separate enclosure. For example, the user interface may be located in the passenger cab and the CEM may be located on an upper internal extremity of the vehicle. This flexible mounting arrangement may help to accommodate a wide range of equipment/vehicles that the CAS may need to track by allowing the user interface to be mounted where it is visible and accessible to the equipment operator while allowing the CEM to be mounted in close proximity to the TSM, which may improve performance, for example by allowing better reception.

The user interface (for example user interfaces 1202 and/or 1204) may be in communication with the CEM 1230, and/or other VMM modules. The user interface may communicate with the CEM, for example, via either a wired interface or a short range wireless connection. One benefit of a wired connection is that the CEM, may contain a power supply interface and/or a power conditioner unit and may be able to provide power to the user interfaces, along with communication functions.

Referring to FIG. 6, the UIM 606 may include a service interface 616 that provides for installation, configuration, maintenance and/or diagnostic activities. The service interface 616 may be incorporated as part of the user interface, or it may be housed separately. In some embodiments, the service interface 616 may be located in the CEM 602. The service interface 616 may also be used to initialize the vehicle mounted module. In other embodiments, the user interface 614 may be used to initialize the vehicle mounted module. For example, the CEM may include a setup program that initializes the various VMM components and subcomponents. An operator may use the user interface 614 or the service interface 616 to input initialization information into the setup program. Such information may include the physical location where various VMM components are mounted on the vehicle, as well as vehicle size and vehicle type. This information may be input when the vehicle mounted module is initially installed on the vehicle.

The service interface 616 may include a variety of technologies that may enable fast and easy communication between an operator and the service interface, and between the service interface and other VMM components and subcomponents. For example, service interface 616 may include one or more USB ports, Ethernet ports, and/or SD memory card slots. Service interface 616 may be configured, for example, with an industry standard Ethernet port to allow the use of commercially available laptop computers that may interface with service interface 616, for example to perform status inquiries, to configure settings of VMM components, and/or to update the software/firmware of VMM components. Ethernet ports generally will conform to the IEEE 802.3 communication standard for 10BASE-T Ethernet (or alternatively 100BASE-T). In addition to Ethernet ports, or in conjunction with Ethernet ports, the service interface 616 may be configured with an 8-position RJ45 modular jack for interconnection. The service interface 616 may also operate as a DHCP server, thus allowing an operator to connect a laptop to the Ethernet port and within a few seconds be automatically configured and communicating with the VMM 600. Alternatively, the service interface 616 may require a static IP address setting to be configured on the laptop. In such a configuration, the service interface may conform to the Internet Protocol Version 4 (IPv4). In some examples, the service interface connectors, such as the Ethernet connectors and the RJ45 connectors, may include environmental dust shields for protection.

In some embodiments, service interface 616 may include wireless capabilities. For example, service interface 616 may include a wireless radio (for example an RF radio), WIFI components and/or other wireless technology. A service interface 616 with wireless capabilities may be adapted to accept "field updates." Field updates refer to updates to the software and/or firmware of VMM modules that are "pushed" to the modules over a wireless link. In one example, a foreman may drive up to a group of vehicles and may push updates to all the vehicles simultaneously, for example without having to physically connect to the vehicles. Alternatively or in addition, wireless communications antenna 608 (and/or other wireless communication antenna(s)) may be used to perform field updates.

In one or more embodiments of the present disclosure, the VMM may include (or may interface with) one or more non-GPS type sensors. These non-GPS type sensors may be adapted to measure speed (also referred to as ground speed) and direction of a rail vehicle. A GPS unit may provide speed and direction information, but in some embodiments and/or in some situations, the non-GPS type sensors may either supplement or replace GPS speed and direction information. For example, non-GPS type sensors may supplement a GPS sensor as a form of redundancy in the system, or may provide speed and direction information when the GPS unit cannot communicate with satellites (for example, when a vehicle is inside a tunnel). Additionally, these non-GPS type sensors may allow the CAS to determine relative vehicle position. For example, the non-GPS type sensors may calculate relative vehicle position as a function of the offset from the last known GPS location.

One type of non-GPS type sensor is an encoder module. An encoder module may be adapted to measure ground speed and direction of a rail line vehicle. The encoder module may supplement the UWB technology or replace the UWB technology, for example as a method of providing more precise "dead reckoning" data to the CAS, helping to overcome the "dead reckoning" limitations of earlier systems. In one embodiment, the encoder module may include a small rubber wheel which contacts the top of a rail on which the vehicle travels. The encoder module may be mounted on an adjustable preloaded assembly which maintains contact with the rail. A magnetic rotary encoder may count the rotations of the wheel. In one example, an encoder module may use a small integrated Hall-ASIC to determine the rotational speed of the wheel. This wheel rotation information may be translated into distance information which may be communicated to a CEM either through a wired or wireless connection.

The encoder module may be adapted to allow the encoder assembly be manually or automatically raised from the tracks for maintenance or lifting of the vehicle from the tracks. The encoder module may also include auto calibration features. For example, as the encoder wheel turns, it may utilize GPS data, when it is available, to review the last distance traveled, and compare that with the number of rotations of the wheel. This information can be constantly updated and used to compensate for wheel wear and or track slippage. Referring to FIG. 7, a CEM 700 may include one or more interfaces such that a VMM may communicate with one or more non-GPS type sensors. An encoder module, for example, may be in communication with a CEM, typically connected to a module interface. As an example, FIG. 7 depicts an encoder module 750 connecting to a CEM 700 via an interface 706.

Another type of non-GPS type sensor that may be in communication with a VMM is microwave radar, for example a Doppler radar. A microwave radar may be adapted to measure ground speed and direction of a rail vehicle. In one example, a microwave radar may be mounted on a rail line vehicle and may be oriented to point at the ground to detect ground speed and direction of travel. A microwave radar, for example, may be in communication with a CEM, typically connected to a module interface. As an example, FIG. 7 depicts a microwave radar 752 connecting to a CEM 700 via an interface 706.

Another type of non-GPS type sensor that may be in communication with a VMM is a laser device. A laser device may be adapted to measure ground speed and direction of a rail vehicle. In one example, laser device may be mounted on a rail line vehicle and may be oriented to point at the ground. A laser device may bounce a signal off of the ground (or other stationary object) to detect ground speed and direction of travel. A laser device, for example, may be in communication with a CEM, typically connected to a module interface. As an example, FIG. 7 depicts a laser device 754 connecting to a CEM 700 via an interface 706.

Other types of non-GPS sensors that may be used in conjunction with the GPS sensor to detect ground speed and direction of travel include infrared sensors, UWB sensors as described herein, UWB radar sensors, and other types of radar sensors. These non-GPS type sensors may add redundancy to the GPS sensor, or they may provide information when GPS information is temporarily unavailable. One or more parts of one or more of the non-GPS type sensors may be packaged in the same enclosure as other VMM modules, or they may be packaged separately.

In operation, the CAS may be capable of precisely tracking the location and separation distances of vehicles equipped with appropriate equipment and/or components as described herein. When the CAS is tracking vehicles, a particular work gang may be operating in one of two modes for example—travel mode or work mode. For each mode, railroad companies may require that a specific spacing be maintained between vehicles. In work mode, the vehicles may be traveling at a speed of less than 10 MPH, and about 40 to 50 feet of spacing between vehicles may be required. In travel mode, the vehicles may be traveling at speeds of up to around 25 MPH, and about 300 feet to about 500 feet of spacing between vehicles may be required. Depending on the mode in which the vehicles are operating, the CAS may adjust its sensitivity and/or settings in order to better predict when collisions may be imminent.

For the CAS to operate optimally, each vehicle in a work gang may need to be equipped with a VMM. The VMMs mounted on/in the vehicles and the CTU may only be able to detect vehicles which are outfitted with a VMM. In one embodiment of the present disclosure, the CAS requires that every vehicle in a work gang be equipped with a VMM. If all vehicles in a work gang are equipped with a VMM, the CAS may be adapted to eliminate false warnings which plague existing systems, such as radar-based systems.

Figure 13:
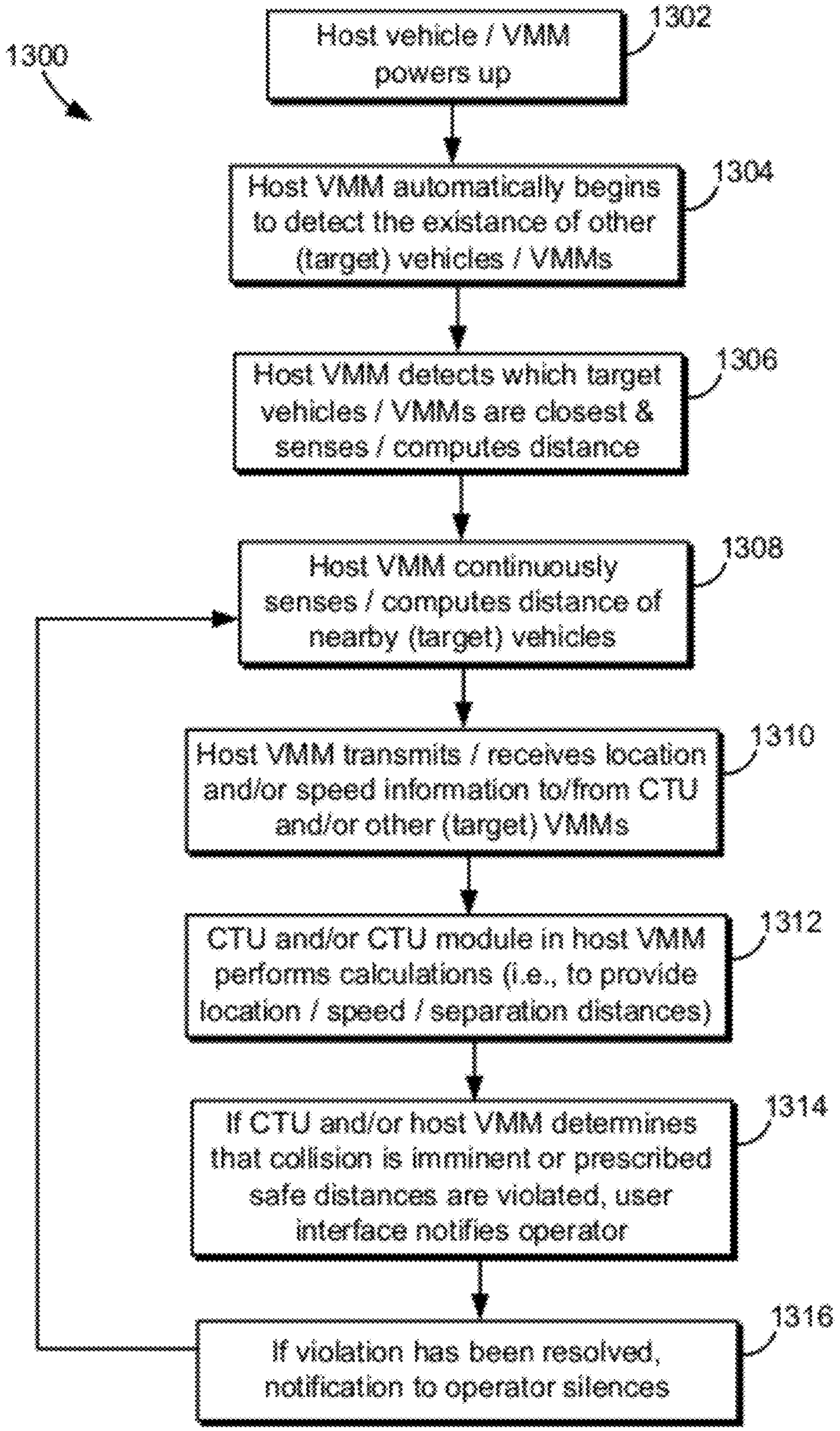
FIG. 13 depicts a flow diagram that shows exemplary steps in the operation of a collision avoidance system, in accordance with one or more embodiments of the present disclosure.

FIG. 13 depicts a flow diagram 1300 that shows exemplary steps in the operation of a CAS, in accordance with one or more embodiments of the present disclosure. To explain the operation of a particular vehicle/VMM, the immediate vehicle/VMM may be referred to as the “host” and nearby vehicles/VMMs with which the host links/communicates may be referred to as “targets”. It should be understood that when the functionality of a host in relation to targets is explained, each target may also act as a host for the purposes of explaining how that target vehicle operates in relation to nearby vehicles.

Referring to FIG. 13, at step 1302, the host vehicle/VMM is powered up. This may be referred to as the initial start-up. The VMM may begin to operate whenever a vehicle’s systems are powered up. At step 1304, within a few seconds of initial startup, the host VMM may begin to automatically detect the existence of other vehicles/VMMs in the vicinity. For example, the host VMM may automatically activate one or more vehicle communication devices to search for/link with other vehicles (targets) both in front of the host vehicle and/or behind the host vehicle. The host may survey its surroundings to determine if there is any other VMM-type equipment nearby. At step 1306, the host may determine which discovered targets, both in front and in back, are the closest and may sense/measure the actual separation distance between the closest target in front and the closest target in the back. In some embodiments, the host may sense and compute distances for vehicles beyond just the vehicles immediately to the front and back of the host. At step 1308, the host VMM may continuously sense/calculate distances between the host vehicle and the target vehicles. In some embodiments, the host may sense and compute distances for vehicles beyond just the vehicles immediately to the front and back of the host.

At step 1310, the host (and perhaps other target vehicles) may transmit location and speed information to the CTU, for example through the radio antenna. Additionally or alternatively, the host VMM may transmit (and/or receive) location and speed information, for example through one or more vehicle communication devices, to target vehicles/VMMs. At step 1312, the CTU and/or CTU module inside the host VMM may calculate information, for example absolute and relative location of the vehicles in the work gang, speed and direction of vehicles, separation distances and/or safe distance violations. At step 1314, if the CTU and/or host VMM determines that collision is imminent or prescribed safe distances are violated, the host VMM, for example via a user interface, may notify the operator. For example, if the speed and direction information violates preset separation criteria, one or more warning indicators and/or audible buzzers, alarms and the like will activate. Additionally, the host VMM may communicate the violation to the CTU, perhaps through the radio antenna. At step 1316, if the separation violation has been resolved, for example by the movement of vehicles away from each other, the warning/notification indicator to the operator may silence, and the host may resume monitoring for other potential violations by continuously sensing nearby vehicles and computing separation distances (return to step 1308).

Figure 14:
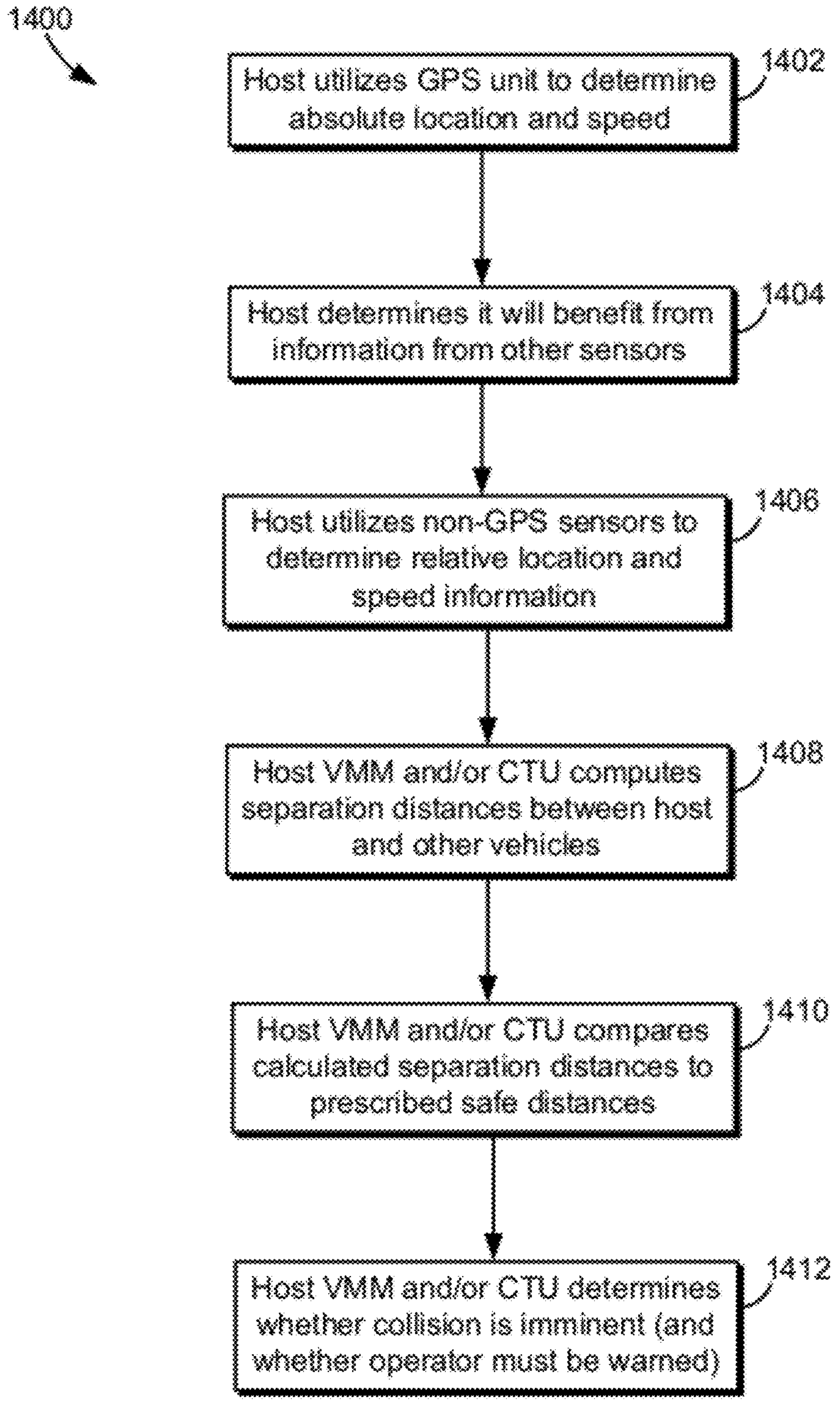
FIG. 14 depicts a flow diagram that shows exemplary steps in the operation of a collision avoidance system, in accordance with one or more embodiments of the present disclosure.

FIG. 14 depicts a flow diagram 1400 that shows exemplary steps in the operation of a CAS, in accordance with one or more embodiments of the present disclosure. Specifically, flow diagram 1400 shows exemplary steps illustrating how a CAS may determine distances between vehicles. Each vehicle in a work gang may include a GPS unit as well as other sensor technologies such as UWB sensors.

At step 1402, a host may utilize its GPS unit to determine its absolute location and speed (and perhaps direction of travel). At step 1404, the host may determine that it would benefit from information from other non-GPS type sensors. For example, one or more vehicles in the work gang may become unable to utilize the vehicle’s GPS unit. Vehicles may travel through tunnels, mountains and developed areas that include structures that may prevent or reduce the functionality of GPS-based technologies, resulting in the GPS signal being lost (the “dead reckoning” situation). In these types of situations, the host may determine that other types of sensors included in (or in communication with) the VMM may aid in determining the precise location of vehicles. Even if the GPS signal is not lost, these other types of sensors may be used to enhance the precision of the location information gathered with respect to a vehicle. At step 1406, the host may utilize non-GPS sensors to determine relative location and speed information. The host may utilize one or more vehicle communication devices. For example, the UWB unit may determine separation distance and closing speed. The host may utilize components connected to the VMM via component interfaces. For example, a Doppler radar or encoder wheel may determine ground speed and direction of travel.

At step 1408, the host VMM and/or the CTU may compute separation distances between the host and other vehicles. For example, the microprocessor in the CEM (a component of the VMM) may compute the separation distance between the host and adjacent vehicles. In one illustrative example, a maintenance vehicle (the host) is 40 feet long, and a TSM is installed 10 feet behind the front of the vehicle. Another maintenance vehicle (the target) is also 40 feet long, and a TSM is installed 30 forward from the back of the vehicle. If there is 50 feet between the front of the host vehicle and the rear of the target vehicle, the CAS will measure a distance between the TSMs of 90 feet (10 feet+50 feet+30 feet). The CAS may then perform calculations to compensate for the placement of the TSMs relative to the front and rear of the vehicles. For example, the CAS will subtract 10 feet and 30 feet (the respective distances between the each TSM and the relevant ends of the vehicle) and determine a separation distance of 50 feet (90 feet−10 feet−30 feet).

At step 1410, the host VMM and/or the CTU may compare computed separation distances to prescribed (safe) separation distances for the given vehicle speed/size. At step 1412, the host VMM and/or the CTU may determine whether a collision is imminent and whether an operator must be cautioned. The CAS may consider a variety of types of data and scenarios to determine if a collision is imminent. For example, a separation distance of 40 feet may be acceptable when vehicles are traveling at 5 miles per hour, but if the vehicles are traveling at 20 miles per hour, an unsafe condition may exists and the operator will be notified with an audible and visual alert. In another example, a vehicle that is far ahead may not pose a hazard, but one that is directly ahead, and moving slower than the host vehicle may be a potential collision hazard. In another example, two vehicles may have been creeping along the tracks at a separation distance of 100 feet, and then the vehicles speed up to reach another worksite. If the separation distance does not increase with the increase in speed, the CAS may sound a warning or alarm.

Using various combinations of technologies (UWB, encoder modules, radar, etc.), the CAS can monitor the precise relative location and speed of the vehicles in a work gang, and determine whether a predetermined separation distance has been violated. The CAS may notify, caution, and/or alarm vehicle operators and/or other railroad personnel (via audible and/or visual indicators) when the separation distances between rail line vehicles becomes less than a specified safe distance, which may indicated that a vehicle is approaching another vehicle and is within a separation distance which may not be safe. The specified safe distance may be programmed by trained service technicians.

Instead of sounding a “hard” alarm through visual and audible alarms when a separation distance is violated, the CAS may utilize a “progressive” warning approach. In general, as the relative spacing between potential alarm events decreases, the collision avoidance system may increase the severity of the warning indication. For example, if a vehicle is on a collision course but has not yet reached a hard threshold, the collision avoidance system may initiate a “soft” alarm/notification initially, such as a short, quiet, visible-only or subdued alarm. The rate, frequency, prominence and/or severity of the alarm may then increase as the vehicles get closer to the hard alarm threshold (indicating a more critical threat condition).

The CAS may adjust its thresholds according to the speed of one or more vehicles. This feature may be referred to as an “adaptive threshold” feature. The adaptive threshold feature may allow for scaling of thresholds of the alarm/notification levels based upon the speed of the immediate vehicle and the relative speed of the immediate vehicle and a vehicle that may collide with the immediate vehicle. For example, when vehicles are traveling to a worksite, at a speed of about 25 miles per hour for example, the expected separation distance may be about 300 to about 500 feet. In a scenario where a vehicle is at a worksite, moving slowly, the expected separation distance may be smaller, for example about 40 to 50 feet. The relative vehicle speed determines how long we have to respond to the issue, and our vehicle speed determines how long the stopping distance will be, which is non-linear.

The CAS may also include an option, mode or switch whereby an operator or a railroad foreman can temporarily deactivate/silence (for example via a user interface) the separation warning/notification features of one or more vehicles. Once silenced, a warning/notification may not repeat until the vehicle separation has again exceeded prescribed safe distances, or, for example, the warning/notification may sound again after a defined period of time if the separation distance violation has not been improved. This silencing feature may allow for periodic, sanctioned violations of prescribed separation distances without alarms, buzzers and the like becoming a nuisance to the operators. An operator may simply acknowledge that the violation of the separation distance was deliberate and the notification may not repeat, until another violation occurs for example. If the violation is not acknowledged, the notification/alarm may repeat periodically.

In some situations, for example, a vehicle operator may be asked by his foreman to temporarily violate the prescribed work separation distances, such as when vehicles come together for a meeting. In this situation, vehicles will slowly approach other vehicles and stop close to other vehicles, so that the work gang may be in a tight group. The operators can then dismount and walk a short distance for a meeting. The collision avoidance system may be designed to accommodate this tight-group situation without needlessly activating alarms, annoying railroad personnel and causing nuisance false alarms, for example by detecting very slow-speed approaches. In some examples, a deactivation may require an operator or a foreman to use a key, code, password or the like to gain authorization to deactivate the warning features. This will prevent an accidental or unauthorized deactivation that may lead to an accident where no warning was sounded. In other examples, the collision avoidance system may automatically reactivate the separation warning features after a certain amount of time, or when the vehicles separate a certain distance (or satisfy a certain distance/speed ratio), so that the system remains in an active tracking and warning mode when the vehicles are working or traveling.

Figure 15:
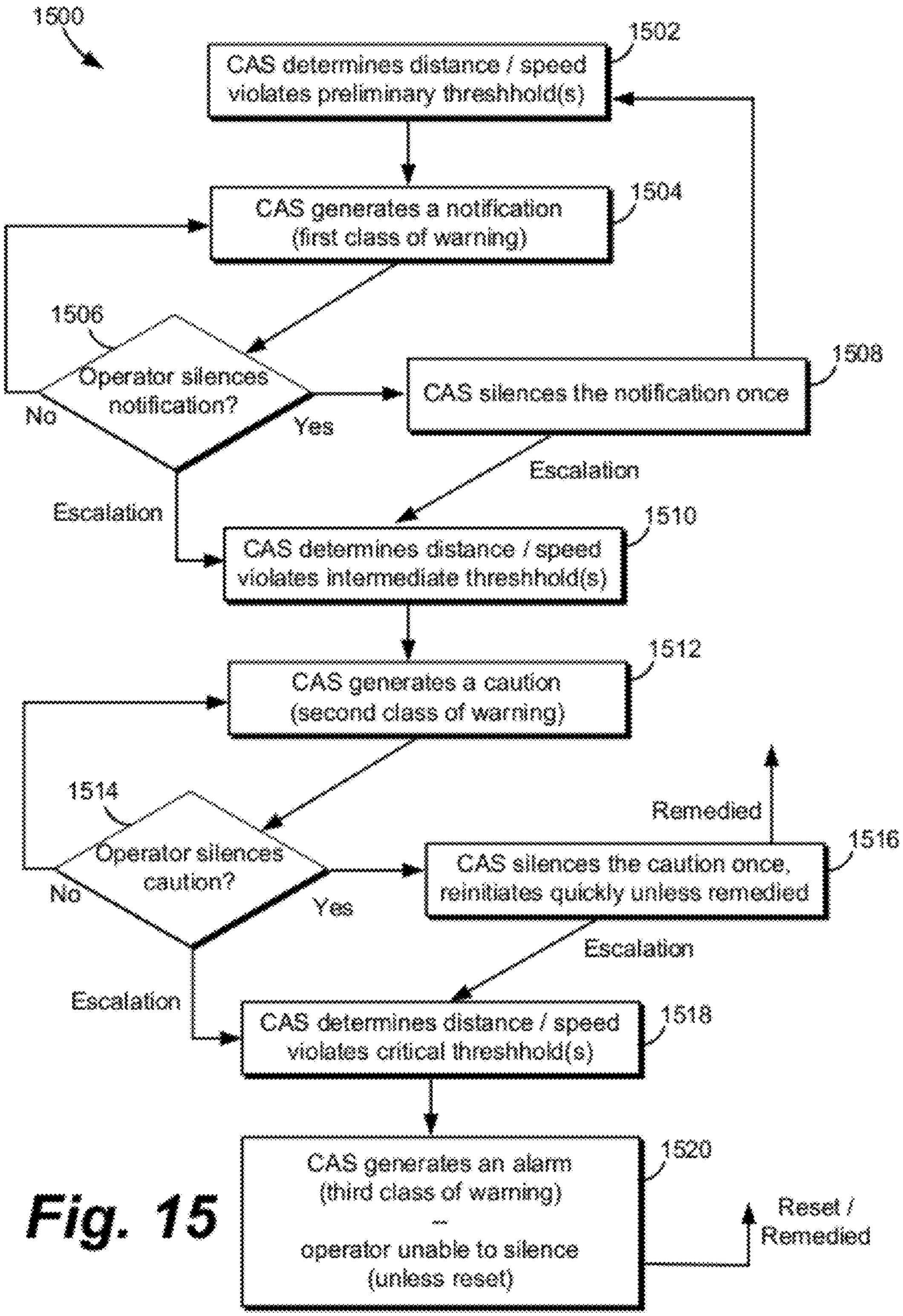
FIG. 15 depicts a flow diagram that shows exemplary steps in the operation of a collision avoidance system, in accordance with one or more embodiments of the present disclosure.

FIG. 15 depicts a flow diagram 1500 that shows exemplary steps in the operation of a CAS, in accordance with one or more embodiments of the present disclosure. Specifically, flow diagram 1500 shows exemplary steps in the operation of a progressive/graduated warning system. In some embodiments, the CAS may utilize a progressive/graduated warning approach that utilizes classes of warnings and/or notifications. The CAS may start by initiating one class of warning, and then escalate to a more severe class of warning if certain distance/speed measurements violate certain thresholds. Separation distances for progressive/graduated thresholds may be based upon vehicle stopping distance test results as explained elsewhere herein. With regard to the following descriptions, it should be understood that a reference to the CAS or the VMM or the CTU performing a calculation, making a determination, generating a warning/alarm, or other events may actually be performed and/or generated by one or more components within the CAS, VMM and/or CTU.

At step 1502, the CAS system may determine that a certain distance/speed measurements violate one or more certain preliminary thresholds. At step 1504, the CAS generates a first class of warning. In one example, the first class of warning may be labeled as a "notification." In certain situations, it may not be dangerous to violate preliminary thresholds (for example, in the case of work vehicles congregating for a meeting), and thus notifications may be designed to allow operators to ignore/silence them. At step 1506, the CAS may accept input from an operator regarding whether the operator wants to silence the notification. For example, an operator could indicate an "acknowledge" choice via a button, touch screen or the like. At step 1508, if the operator chooses to silence/acknowledge the notification, this may silence the notification once, at least until a violation that leads to a notification reoccurs. Notifications may be auto ignored in certain situations, for example, if vehicles are moving very slowly. Notifications may be less prominent than other classes of warnings. For example, notifications may display on a screen on the user interface, and may initiate a short sound, without being too annoying or distracting to the operator.

At step 1510, the CAS system may determine that a certain distance/speed measurements violate certain intermediate thresholds, thresholds that the CAS system has determined present a higher risk of collision. At step 1512, the CAS may generate a second class of warning. In one example, the second class of warning may be labeled as a "caution" warning. In certain situations, it may not be dangerous to violate these intermediate thresholds, at least momentarily, and thus notifications may be designed to allow operators to ignore/silence them momentarily. At step 1514, the CAS may accept input from an operator regarding whether the operator wants to silence the caution. At step 1516, silenced caution warnings may reinitiate quickly if silenced, unless the situation that led to the caution warning is remedied. Caution warnings may be more prominent than notifications but may be less prominent than other more severe classes of warnings. For example, caution warnings may display on a screen on the user interface in a more prominent manner than notifications, such as by blinking, taking up more of the user interface screen, etc. Caution warnings may initiate a louder sound than notifications, but may be designed to avoid being too annoying or distracting to the operator.

At step 1518, the CAS system may determine that certain distance/speed measurements violate certain critical thresholds, thresholds that the CAS system has determined present a high risk of collision and require immediate correction. At step 1520, the CAS may generate a third class of warning. In one example, the third class of warning may be labeled as an "alarm" warning. In certain situations, it may be dangerous to violate these critical thresholds, and thus alarms may be designed to prevent operators from ignoring/silencing them. Caution warnings may be designed to get the attention of an operator very quickly, for example by being prominent, loud, frequent, bright and the like. For example, alarms may display on a screen on the user interface in a very prominent manner, such as by blinking, taking up the entire user interface screen, etc. Alarms may initiate a loud sound, and may be designed to be annoying and/or attention getting in order to force the operator to take steps to remedy the situation. Once the operator takes steps to remedy the situation, the warnings may scale back from "alarm" to "caution" to "notification" classification and/or may stop completely.

The progressive/graduated warning system described in relation to FIG. 15 may utilize an "adaptive threshold" feature, whereby one or more thresholds (for example the preliminary, intermediate and critical thresholds) may be modified depending on the speed of one or more vehicles. The adaptive threshold feature may allow for scaling of thresholds of the alarm/notification levels based upon the speed of the immediate vehicle and the relative speed of the immediate vehicle and a vehicle that may collide with the immediate vehicle.

As explained above, the maintenance vehicles often work in work gangs comprising a plurality of vehicles, for example, a group of between four and forty vehicles, and the collision avoidance system is capable of tracking each vehicle that is part of the work gang. In some embodiments of the present technology, however, a single collision avoidance system may be responsible for tracking vehicles that are part of more than one work gang. For example, the collision avoidance system may track group A and group B. A collision avoidance system may be designed to distinguish between multiple work gangs so that the collision avoidance system can determine which vehicles are on the same track. In the event that maintenance vehicles are on two closely-located parallel tracks, it may be difficult for the collision avoidance system to determine which vehicles are on the same track and thus present real collision risks. The CAS may be adapted and/or programmed to handle work group designations/associations in order to limit unwanted detections of other maintenance vehicles on adjacent tracks.

In some embodiments, the VMMs and/or the CTU may include a switch, button, touch screen or the like that may be adapted to allow an operator to select from multiple group associations. All maintenance vehicles on a single track, for example, may set their switch, button, touch screen or the like to select the same group association/setting, and vehicles on a second parallel or other close but separate track may select a different group association/setting. The collision avoidance system may be adapted to ignore (or distinguish) the vehicles on the other tracks (vehicles with an alternate group association/setting), when tracking vehicles within a target group. For example, the work group selections/associations may allow the VMMs/CTU to only notify or alarm an operator when a separation distance violation is detected with other vehicles on the same track/rail. In some embodiments, the CAS may calculate the locations of vehicles using GPS data (or data from other positioning components) and may determine vector locations of such vehicles from which a reasonable calculation of track location can be determined. Other vehicles on an alternate vector could be dismissed by the collision avoidance system when tracking vehicles within a target group.

In some embodiments of the present disclosure, the CAS may include a stopping distance calibration feature and/or may perform a stopping distance calibration method. The stopping distance calibration feature/method may determine how quickly a rail line vehicle can stop under current conditions. For example, during a maintenance project, the work gang generally performs a stopping distance test (for example, at the beginning of each work day) where a vehicle is run at a speed (for example, 25 miles per hour) and then the vehicle's brakes may be engaged and a distance may be measured from the point where the brakes were engaged to the point where the vehicle comes to a stop. This distance may be referred to as the "stopping distance." If the weather changes and the tracks become wet (or dry), a similar stopping distance test may be performed again, and a new distance measured.

After the stopping distance is measured, the CAS may calculate various safety metrics based on the stopping distance. For example, a safe following distance between vehicles may be adjusted according to the stopping distance. In some embodiments, the collision avoidance system may maintain minimum/default metrics and then adjust the metrics if necessary based on the stopping distance. For example, a minimum/default following distance may be maintained in all situations, and the following distance may be adjusted upwards (extended) if the stopping distance is relatively high. The stopping distance may be used in conjunction with an adaptive threshold feature of a progressive/graduated warning system as described above. For example, one or more safe separation distance thresholds (for example preliminary, intermediate and critical thresholds) may be modified depending on the stopping distance. The adaptive threshold feature may allow for scaling of thresholds of the alarm/notification levels based upon the stopping distance. In one example, one or more alarm thresholds may be made more strict if the stopping distance is too high, resulting in earlier alarms, for example to allow sufficient time to stop under the current conditions.

The CAS may include an automatic/real-time stopping distance calibration feature that, when triggered, may automatically calculate the stopping distance using information from the vehicle mounted module's GPS unit and/or inertial measurement unit (for example an accelerometer or a gyroscope). The new following distance will then be automatically calculated and utilized automatically as the collision avoidance system monitors for proper vehicle separation distance.

The CAS may create and/or maintain one or more logs of events that occur during the operation of the collision avoidance system. The individual VMMs may log information regarding the vehicle on which the vehicle mounted module is mounted. The CTU may also log information regarding the several vehicles in the work gang that the CTU tracks. Saved logs may be downloadable by an authorized person, for example via a cable or a wireless connection to a laptop computer or via an interface card. The amount of log data and time periods of data may be adjustable. Each log entry may be stamped with various types of information, for example the time and duration of the event occurrence, an ID, speed and location of the vehicle and the nature of the event. The collision avoidance system may also log information from a vehicle mounted module's inertial measurement unit (for example an accelerometer or a gyroscope) and/or other shock and impact sensors mounted on a vehicle to record significant impact data related to an incident. All warnings and alarms may be logged as well. Detailed log information may allow railroad personnel to reconstruct the details of an incident. The CAS may allow for logging of vehicle positioning over time using GPS satellite data. This feature allows long term tracking of vehicle location and activities. The CAS may allow for logging of data related to one or more stopping distance calibration tests, for example routine/daily stopping distance calibration tests and/or automatic/real-time stopping distance calibration tests.

In some embodiments of the present disclosure, the collision avoidance system may include the ability to monitor worker presence around machines so that a worker or foreman may be alerted if a worker is standing in an unsafe location. For example, if a worker is standing on the tracks near a vehicle as another vehicle approaches and violates a predetermined separation criteria, the worker and the foreman may be alerted, and perhaps emergency brakes may be activated. The collision avoidance system may monitor the workers by communicating with a communication device that is located on the worker, for example attached to the worker's badge. In one example, the communication device may be an RFID device. In another example, the communication device may be a UWB device, for example a subset of a UWB ranging system that includes components, some that are located on vehicles and some components that are located on workers.

A communication device located on a worker may communicate with one or more components located in one or more vehicle mounted modules, and/or it may communicate with a central tracking unit in a discrete housing. For example, if the communication device communicates with a vehicle mounted module, the vehicle mounted module may determine the orientation and distance of the worker in relation to the vehicle.

In some embodiments of the present disclosure, the collision avoidance system may utilize the concepts described herein to monitor the "vehicle stretch" of a train that includes several cars. As a train starts, stops and changes speed, the "play" in the couplings between the cars may allow the total length of the train to change. For example, if the train starts to slow down, the cars may compact closer to each other as the couplings lock more closely, and the overall length of the train may decrease. The opposite may occur if the train begins to accelerate, for example. Vehicle stretch is an important concept because it may be a measure of efficiency in the vehicle. Stretching and compacting of the vehicles wastes energy, and if the stretch of a vehicle can be monitored, the vehicle may be designed to reduce stretch. The collision avoidance system technologies described herein, for example the UWB technology and other close proximity sensing technologies, may be used to monitor distance between train cars, and then calculations can be made in the collision avoidance system to determine vehicle stretch.

In some embodiments of the present disclosure, the collision avoidance system may monitor, nationwide, locations and speeds of vehicles, equipment and/or workers equipped with collision avoidance system technology. For example, this may allow a central railroad office to monitor several work projects that are underway at several different locations throughout the country.

In some embodiments of the present disclosure, the collision avoidance system may have the ability to interface with rail line crossing technology to control gates while the vehicles work under the surveillance of the collision avoidance system. For example, if the collision avoidance system and the crossing technology were engineered by the same company, group or firm, the interface may be seamless.

Regarding the benefits of the collision avoidance system, in addition to the benefits already described in this disclosure, the following describes further benefits of one or more embodiments of the present technology. It is to be understood that the described benefits are not limitations or requirements, and some embodiments may omit one or more of the described benefits. In some embodiments, a benefit of the collision avoidance system may be that it is implemented as a supplement to existing safety procedures and devices already established for railroad maintenance vehicles and personnel. Alternatively, the collision avoidance system may be implemented as a primary (and perhaps the sole) collision avoidance and safety system.

Other benefits of the collision avoidance system can be realized when the collision avoidance system is compared to a single-sensor collision avoidance technology. Single sensor technologies do not work well when the work environment includes environmental and physical limitations. In addition to the complexities of tracking vehicles that travel through tunnels, mountains, building and the like, tracking vehicles can also become more complex when the vehicles travel or operate around curves or when the vehicles operate at night or during rain, snow and fog. Curves and other weather conditions create complex sensing environments that render single sensor technologies and/or strictly line-of-sight technologies inadequate. The multi-sensor approach of the collision avoidance system described above, allows for precise tracking of vehicles in these situations.

Another benefit of the collision avoidance system is that railroad companies can use the collision avoidance system to maintain an efficiently running railroad. For example, when an accident occurs in a remote area with single track, it may take days to re-open track after an accident. If the railroad companies can avoid more collisions and keep the tracks open, users of the railroad can make more efficient use of the railroad. A related benefit is that the collision avoidance system can significantly reduce the cost of running a railroad. Not only will the collision avoidance system help the railroad reduce the number of accidents, but the collision avoidance system logging functionality will give the railroads the ability to store data regarding accidents. This information may be used to alleviate rail payouts in the event of worker liability.

Although the present disclosure describes a collision avoidance system that may be applied to a work gang of railroad vehicles, the technology and the concepts described herein may be utilized in other vehicles, applications and/or industries, for example, in industries where spacing, location and status is important. Some industries that may utilize the concepts described herein are (1) the construction industry, (2) the mining industry, (3) the airport industry, specifically on airport tarmacs.

In some alternative implementations of the present disclosure, the function or functions illustrated in the blocks or symbols of a block diagram or flowchart may occur out of the order noted in the figures, and/or may include more or less steps than are shown in the figures. For example in some cases two blocks or symbols shown in succession may be executed substantially concurrently or the blocks may sometimes be executed in the reverse order depending upon the functionality involved.

One or more embodiments of the present disclosure may be realized in hardware, software, or a combination of hardware and software. The present disclosure may be realized in a centralized fashion in at least one machine, computer and/or data processing system; or in a distributed fashion where different elements are spread across several interconnected machines, computers and/or data processing systems. Any kind of machine, computer and/or data processing system or other apparatus adapted for carrying out the methods described herein is suited. A typical combination of hardware and software may be a general-purpose computer system with a computer program that, when being loaded and executed, controls the computer system such that it carries out the methods and techniques described herein.

Some embodiments of the present disclosure may provide a non-transitory machine and/or computer-readable storage and/or media, having stored thereon, a machine code and/or a computer program having at least one code section executable by a machine, computer and/or data processing system, thereby causing the machine, computer and/or data processing system to perform the steps as described herein. One example of a data processing system is a general purpose computer.

Some embodiments of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

In the present specification, use of the singular includes the plural except where specifically indicated. In the present specification, any of the functions recited herein may be performed by one or more means for performing such functions. The present systems and methods may include various means, modules, code segments, computer programs and/or software for performing one or more of the steps or actions described in this specification. It is expressly contemplated and disclosed that the present specification provides a written description for claims comprising such means, modules, steps, code segments, computer programs and/or software.

The description of the different advantageous embodiments has been presented for purposes of illustration and description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments the practical application and to enable others of ordinary skill in the art to understand the disclosure for various embodiments with various modifications as are suited to the particular use contemplated.

The invention claimed is:

1. A collision avoidance system comprising:

one or more vehicle mounted modules, each vehicle mounted module mountable on a rail vehicle, each vehicle mounted module comprising:

a transponder sensor module operable to send and receive data wirelessly, the transponder module comprising a first ultra wideband unit and a first antenna;

a control electronics module comprising a processor in communication with at least the transponder sensor module unit; and a user interface module including a user interface, the user interface being operable to provide rail vehicle information to a vehicle operator and to receive input from the vehicle operator; and wherein each vehicle mounted module is operable to communicate with at least one other vehicle mounted module mounted on at least one other rail vehicle, and wherein each vehicle mounted module is operable to apply a time of flight technique to determine a separation distance between the rail vehicles.

2. The collision avoidance system of claim 1, further comprising a central tracking unit in communication with the first vehicle mounted module and the second vehicle mounted module, wherein the central tracking unit is operable to track the location of at least the first vehicle mounted module and the second vehicle mounted module.

3. The collision avoidance system of claim 2, wherein the central tracking unit is distributed among a plurality of rail vehicles, including at least the first and second rail vehicles, wherein the first vehicle mounted module comprises a first central tracking unit component.

4. The collision avoidance system of claim 2, wherein the central tracking unit is located in a discreet housing.

5. The collision avoidance system of claim 1, wherein the first vehicle mounted module further comprises an auxiliary transponder sensor module, the auxiliary transponder sensor module mounted on the first rail vehicle with an offset with respect to the transponder sensor module, and wherein the user interface is operable to provide calibration information related to the length of the first rail vehicle, the mounting location of the first transponder sensor module, and the mounting location of the auxiliary transponder sensor module.

6. The collision avoidance system of claim 5, wherein the auxiliary transponder sensor module comprises an auxiliary antenna, the auxiliary antenna being connected to at least one of the first ultra wideband unit or an auxiliary ultra wideband unit, and wherein the auxiliary antenna is mounted on the first rail vehicle with an offset with respect to the first antenna.

7. The collision avoidance system of claim 1, wherein the first vehicle mounted module further comprises a global positioning system unit, the global positioning system unit operable to receive information from one or more satellites to determine an absolute position of the rail vehicle, wherein the global positioning system unit is in communication with the control electronics module.

8. The collision avoidance system of claim 7, wherein the first vehicle mounted module receives information generated by the global positioning system unit and the first ultra wideband unit to determine whether one or more vehicle separation criteria are violated, and generates a warning signal when one or more vehicle separation criteria are violated.

9. The collision avoidance system of claim 1, wherein the first vehicle mounted module is operable to execute a progressive warning signal if one or more vehicle separation criteria are violated, and wherein the progressive warning signal increases in at least one of signal rate, signal frequency, signal prominence, signal volume, or signal severity as the violation of the vehicle separation criteria approaches or extends beyond a vehicle separation threshold.

10. The collision avoidance system of claim 9, wherein the first vehicle mounted module executes an adaptive threshold feature that modifies one or more vehicle separation thresholds based on the speed of the first rail vehicle and the speed of the second rail vehicle.

11. The collision avoidance system of claim 1, further comprising at least one ground speed detection module operable to determine the speed of the rail vehicle, wherein the first vehicle mounted module communicates with the at least one ground speed detection module.

12. The collision avoidance system of claim 1, further comprising an inertial measurement unit in communication with at least the control electronics module, the inertial measurement unit being operable to detect changes in the speed of the first rail vehicle.

13. The collision avoidance system of claim 12, wherein the inertial measurement unit comprises at least one of an accelerometer or a gyroscope.

14. The collision avoidance system of claim 1 wherein the ultra wideband unit is adapted to transmit and receive signals with varying center frequencies.

15. The collision avoidance system of claim 1, wherein the first vehicle mounted module is operable to execute a stopping distance calibration feature that measures a stopping distance under existing conditions, wherein the stopping distance measures the distance between the point where the brakes are engaged to the point where the vehicle comes to a stop under the existing conditions.

16. The collision avoidance system of claim 15, wherein the first vehicle mounted module executes a progressive warning signal if one or more vehicle separation criteria are violated, wherein the progressive warning signal increases in at least one of signal rate, signal frequency, signal prominence, signal volume, or signal severity as the violation of the vehicle separation criteria approaches or extends beyond a vehicle separation threshold, and wherein the first vehicle mounted module executes an adaptive threshold feature that modifies one or more vehicle separation thresholds based on the measured stopping distance.

17. A rail vehicle module mountable on a rail vehicle, the module comprising:

a transponder sensor module comprising:

a radio communication unit operable to employ time of flight techniques to detect a distance between the rail vehicle and at least one other vehicle;

a wireless communications antenna operable to send and receive data over the air; and a global positioning system unit operable to receive information from one or more satellites to determine an absolute position of the rail vehicle;

a control electronics module comprising a processor in communication with at least the first transponder sensor module; and a user interface module including a user interface operable to provide rail vehicle information to a vehicle operator and to receive input from the vehicle operator; wherein the rail vehicle module communicates with at least one other module mounted on at least one other vehicle to detect a separation distance between the rail vehicle and the at least one other vehicle.

18. The rail vehicle module of claim 17, wherein the radio communication unit comprises an ultra wideband unit configured to send and receive ultra wideband signals.

19. The rail vehicle module of claim 18, wherein the ultra wideband unit is adapted to transmit and receive signals with varying center frequencies.

20. The rail vehicle module of claim 17, further comprising a second wireless communications antenna mounted on the rail vehicle with an offset with respect to the first antenna, wherein the rail vehicle module is operable to receive calibration information related to the length of the rail vehicle, the mounting location of the first wireless communications antenna and the mounting location of the second wireless communications antenna.

21. The rail vehicle module of claim 17, wherein the rail vehicle module is operable to utilize information generated by the radio communication unit and the global positioning system unit to determine whether one or more vehicle separation criteria are violated, and generate a progressive warning signal if one or more vehicle separation criteria are violated, wherein the progressive warning signal increases in at least one of signal rate, signal frequency, signal prominence, signal volume, or signal severity as the violation of the vehicle separation criteria approaches or extends beyond a vehicle separation threshold.

22. The rail vehicle module of claim 17, further comprising a central tracking unit component, wherein the central tracking unit component is in communication with a central tracking unit component mounted on the at least one other vehicle.

23. The collision avoidance system of claim 16, further comprising an inertial measurement unit in communication with at least the control electronics module, the inertial measurement unit being operable to detect changes in the speed of the first rail vehicle.

24. A collision avoidance system comprising one or more vehicle mounted modules, each vehicle mounted module mountable on a rail vehicle, each vehicle mounted module comprising:

a transponder sensor module comprising:

a radio communication unit operable to employ time of flight techniques to detect a distance between rail vehicles; and a global positioning system unit operable to receive information from one or more satellites to determine an absolute position of the rail line vehicle;

a control electronics module comprising a processor, the control electronics module being in communication with at least the transponder sensor module; and a user interface operable to provide rail vehicle information to a vehicle operator and to receive input from the vehicle operator;

wherein each of the two or more rail vehicle modules communicate to determine a separation distance between each rail vehicle, and wherein each rail vehicle module is operable to use information provided by the radio communication unit and the global positioning system unit to determine whether one or more vehicle separation criteria are violated, and to generate a warning signal if one or more vehicle separation criteria are violated.

25. The collision avoidance system of claim 24, wherein each radio communication unit comprises an ultra wideband unit.

26. The collision avoidance system of claim 24, wherein the progressive warning signal increases in at least one of signal rate, signal frequency, signal prominence, signal volume, or signal severity as the violation of the vehicle separation criteria approaches or extends beyond a vehicle separation threshold.

27. The collision avoidance system of claim 24, further comprising a central tracking unit in communication with each rail vehicle module, the central tracking unit operable to track the location of each rail vehicle module.

28. The collision avoidance system of claim 27, wherein the central tracking unit is distributed among the rail vehicle modules, wherein each of the one or more rail vehicle modules includes a central tracking unit component, each central tracking unit component being in communication with the control electronics module of the rail vehicle module.

* * * * *